US011212538B2

(12) United States Patent
Zhang et al.

(10) Patent No.: US 11,212,538 B2
(45) Date of Patent: Dec. 28, 2021

(54) INTERACTION BETWEEN IBC AND ATMVP

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/011,131

(22) Filed: Sep. 3, 2020

(65) Prior Publication Data

US 2020/0404260 A1 Dec. 24, 2020

Related U.S. Application Data

(63) Continuation of application No. PCT/IB2019/054611, filed on Jun. 4, 2019.

(30) Foreign Application Priority Data

Jun. 5, 2018 (WO) ................ PCT/CN2018/089920

(51) Int. Cl.
*H04N 19/107* (2014.01)
*H04N 19/176* (2014.01)
(Continued)

(52) U.S. Cl.
CPC ......... *H04N 19/176* (2014.11); *H04N 19/105* (2014.11); *H04N 19/107* (2014.11);
(Continued)

(58) Field of Classification Search
CPC .. H04N 19/107; H04N 19/132; H04N 19/139; H04N 19/159; H04N 19/167; H04N 19/176
(Continued)

(56) References Cited

U.S. PATENT DOCUMENTS 8,184,715 B1 5/2012 Rosenzweig et al.
8,462,846 B2 6/2013 Zhang
(Continued)

FOREIGN PATENT DOCUMENTS

CA 3025490 A1 12/2017
CA 3037685 A1 3/2018
(Continued)

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting, Torino, IT, Jul. 13-21, 2017, document JVET-G1001, 2017.
(Continued)

*Primary Examiner* — Hesham K Abouzahra
(74) *Attorney, Agent, or Firm* — Perkins Coie LLP

(57) ABSTRACT

Devices, systems and methods for applying intra-block copy (IBC) in video coding are described. In general, methods for integrating IBC with existing motion compensation algorithms for video encoding and decoding are described. In a representative aspect, a method for video encoding using IBC includes determining whether a current block of the current picture is to be encoded using a motion compensation algorithm, and encoding, based on the determining, the current block by selectively applying an intra-block copy to the current block. In a representative aspect, another method for video encoding using IBC includes determining whether a current block of the current picture is to be encoded using (Continued)

an intra-block copy, and encoding, based on the determining, the current block by selectively applying a motion compensation algorithm to the current block.

20 Claims, 8 Drawing Sheets

(51) Int. Cl.
    *H04N 19/105*     (2014.01)
    *H04N 19/117*     (2014.01)
    *H04N 19/119*     (2014.01)
    *H04N 19/583*     (2014.01)
    *H04N 19/139*     (2014.01)
    *H04N 19/159*     (2014.01)
    *H04N 19/167*     (2014.01)
    *H04N 19/132*     (2014.01)

(52) U.S. Cl.
    CPC ......... *H04N 19/117* (2014.11); *H04N 19/119* (2014.11); *H04N 19/132* (2014.11); *H04N 19/139* (2014.11); *H04N 19/159* (2014.11); *H04N 19/167* (2014.11); *H04N 19/583* (2014.11)

(58) Field of Classification Search
    USPC ......................................................... 375/240
    See application file for complete search history.

(56) References Cited

U.S. PATENT DOCUMENTS

| | | | |
|---|---|---|---|
| 9,294,777 B2 | 3/2016 | Wang | |
| 9,374,595 B2 | 6/2016 | Kim et al. | |
| 9,521,425 B2 | 12/2016 | Chen et al. | |
| 9,615,089 B2 | 4/2017 | Fartukov et al. | |
| 9,667,996 B2 | 5/2017 | Chen et al. | |
| 9,674,542 B2 | 6/2017 | Chen et al. | |
| 9,762,927 B2 | 9/2017 | Chen et al. | |
| 9,900,593 B2 | 2/2018 | Xiu et al. | |
| 9,948,930 B2 | 4/2018 | Panusopone et al. | |
| 9,955,186 B2 | 4/2018 | Chon et al. | |
| 10,045,014 B2 | 8/2018 | Zhang et al. | |
| 10,142,655 B2 | 11/2018 | Lin et al. | |
| 10,298,950 B2 | 5/2019 | Wang et al. | |
| 10,362,330 B1 | 7/2019 | Li et al. | |
| 10,404,990 B2 | 9/2019 | Hendry et al. | |
| 10,419,763 B2 | 9/2019 | Huang et al. | |
| 10,448,010 B2 | 10/2019 | Chen et al. | |
| 10,484,686 B2 | 11/2019 | Xiu et al. | |
| 10,523,964 B2 | 12/2019 | Chuang et al. | |
| 10,560,712 B2 | 2/2020 | Zou et al. | |
| 10,701,366 B2 | 6/2020 | Chen et al. | |
| 10,708,592 B2 | 7/2020 | Dong et al. | |
| 10,757,417 B2 | 8/2020 | Zhang et al. | |
| 10,778,999 B2 | 9/2020 | Li et al. | |
| 10,779,002 B2 | 9/2020 | Chen et al. | |
| 10,785,494 B2 | 9/2020 | Chien et al. | |
| 10,805,630 B2 | 10/2020 | Li et al. | |
| 10,841,609 B1 | 11/2020 | Liu et al. | |
| 10,904,565 B2 | 1/2021 | Chuang et al. | |
| 2007/0192762 A1 | 8/2007 | Eichenberger et al. | |
| 2011/0002386 A1 | 1/2011 | Zhang | |
| 2011/0194609 A1 | 8/2011 | Rusert et al. | |
| 2012/0219216 A1 | 8/2012 | Sato | |
| 2012/0287999 A1 | 11/2012 | Li et al. | |
| 2012/0320984 A1 | 12/2012 | Zhou et al. | |
| 2013/0101041 A1 | 4/2013 | Fishwick et al. | |
| 2013/0128976 A1 | 5/2013 | Koyama et al. | |
| 2013/0182755 A1 | 7/2013 | Chen et al. | |
| 2013/0229485 A1 | 9/2013 | Rusanovskyy et al. | |
| 2014/0086325 A1 | 3/2014 | Chen et al. | |
| 2014/0286408 A1 | 9/2014 | Zhang et al. | |
| 2014/0334551 A1 | 11/2014 | Kim et al. | |
| 2015/0023423 A1 | 1/2015 | Zhang et al. | |
| 2015/0181216 A1 | 6/2015 | Zhang et al. | |
| 2015/0312588 A1 | 10/2015 | Yamamoto et al. | |
| 2015/0373350 A1 | 12/2015 | Hendry et al. | |
| 2015/0373357 A1 | 12/2015 | Pang et al. | |
| 2016/0073132 A1 | 3/2016 | Zhang et al. | |
| 2016/0100189 A1 | 4/2016 | Pang et al. | |
| 2016/0142729 A1 | 5/2016 | Wang et al. | |
| 2016/0366441 A1 | 12/2016 | An et al. | |
| 2016/0373756 A1* | 12/2016 | Yu ........................ | H04N 19/176 |
| 2017/0054996 A1 | 2/2017 | Xu et al. | |
| 2017/0142418 A1 | 5/2017 | Li et al. | |
| 2017/0238005 A1 | 8/2017 | Chien et al. | |
| 2017/0238011 A1 | 8/2017 | Pettersson et al. | |
| 2017/0272748 A1 | 9/2017 | Seregin et al. | |
| 2017/0272782 A1 | 9/2017 | Li et al. | |
| 2017/0289566 A1 | 10/2017 | He et al. | |
| 2017/0310990 A1 | 10/2017 | Hsu | |
| 2017/0332000 A1 | 11/2017 | Wang et al. | |
| 2017/0332099 A1 | 11/2017 | Lee et al. | |
| 2017/0339404 A1 | 11/2017 | Panusopone et al. | |
| 2018/0041762 A1 | 2/2018 | Ikai et al. | |
| 2018/0048889 A1 | 2/2018 | Zhang et al. | |
| 2018/0054628 A1 | 2/2018 | Pettersson et al. | |
| 2018/0063553 A1 | 3/2018 | Zhang et al. | |
| 2018/0098062 A1 | 4/2018 | Li et al. | |
| 2018/0098087 A1 | 4/2018 | Li et al. | |
| 2018/0124394 A1 | 5/2018 | Xu et al. | |
| 2018/0131952 A1 | 5/2018 | Xiu et al. | |
| 2018/0184117 A1 | 6/2018 | Chen et al. | |
| 2018/0192069 A1 | 7/2018 | Chen et al. | |
| 2018/0192072 A1 | 7/2018 | Chen et al. | |
| 2018/0247396 A1 | 8/2018 | Pouli et al. | |
| 2018/0270500 A1 | 9/2018 | Li et al. | |
| 2018/0278951 A1 | 9/2018 | Seregin et al. | |
| 2018/0324454 A1 | 11/2018 | Lin et al. | |
| 2018/0332298 A1 | 11/2018 | Liu et al. | |
| 2018/0376166 A1 | 12/2018 | Chuang et al. | |
| 2019/0037231 A1 | 1/2019 | Ikai et al. | |
| 2019/0052886 A1 | 2/2019 | Chiang et al. | |
| 2019/0058897 A1 | 2/2019 | Han et al. | |
| 2019/0075293 A1 | 3/2019 | Lim et al. | |
| 2019/0104303 A1 | 4/2019 | Xiu et al. | |
| 2019/0124332 A1 | 4/2019 | Lim et al. | |
| 2019/0158866 A1 | 5/2019 | Kim | |
| 2019/0191171 A1* | 6/2019 | Ikai ........................ | H04N 19/51 |
| 2019/0222859 A1 | 7/2019 | Chuang et al. | |
| 2019/0246128 A1* | 8/2019 | Xu ........................ | H04N 19/159 |
| 2019/0246143 A1* | 8/2019 | Zhang .................. | H04N 19/159 |
| 2019/0273943 A1 | 9/2019 | Zhao et al. | |
| 2019/0306502 A1 | 10/2019 | Gadde et al. | |
| 2019/0320181 A1 | 10/2019 | Chen et al. | |
| 2019/0335170 A1 | 10/2019 | Lee et al. | |
| 2019/0342547 A1 | 11/2019 | Lee et al. | |
| 2019/0364295 A1 | 11/2019 | Li et al. | |
| 2019/0373261 A1 | 12/2019 | Eglimez et al. | |
| 2019/0387250 A1 | 12/2019 | Boyce et al. | |
| 2020/0021837 A1 | 1/2020 | Ikai et al. | |
| 2020/0045310 A1 | 2/2020 | Chen et al. | |
| 2020/0053364 A1 | 2/2020 | Seo | |
| 2020/0084441 A1 | 3/2020 | Lee et al. | |
| 2020/0099951 A1 | 3/2020 | Hung et al. | |
| 2020/0112741 A1 | 4/2020 | Han et al. | |
| 2020/0120334 A1 | 4/2020 | Xu et al. | |
| 2020/0137398 A1 | 4/2020 | Zhao et al. | |
| 2020/0145688 A1 | 5/2020 | Zou et al. | |
| 2020/0154127 A1 | 5/2020 | Lee | |
| 2020/0169726 A1 | 5/2020 | Kim et al. | |
| 2020/0213594 A1 | 7/2020 | Liu et al. | |
| 2020/0213612 A1 | 7/2020 | Liu et al. | |
| 2020/0213622 A1 | 7/2020 | Xu et al. | |
| 2020/0221077 A1 | 7/2020 | Park et al. | |
| 2020/0221110 A1 | 7/2020 | Chien et al. | |
| 2020/0221120 A1 | 7/2020 | Robert et al. | |
| 2020/0267408 A1 | 8/2020 | Lee et al. | |
| 2020/0275120 A1 | 8/2020 | Lin et al. | |
| 2020/0296380 A1 | 9/2020 | Aono et al. | |
| 2020/0296415 A1 | 9/2020 | Chen et al. | |
| 2020/0336738 A1 | 10/2020 | Xiu et al. | |

(56) References Cited

U.S. PATENT DOCUMENTS

| | | |
|---|---|---|
| 2020/0351505 A1 | 11/2020 | Seo |
| 2020/0359029 A1 | 11/2020 | Liu et al. |
| 2020/0374543 A1 | 11/2020 | Liu et al. |
| 2020/0374544 A1 | 11/2020 | Liu et al. |
| 2020/0382771 A1 | 12/2020 | Liu et al. |
| 2020/0382795 A1 | 12/2020 | Zhang et al. |
| 2020/0382807 A1 | 12/2020 | Liu et al. |
| 2020/0396453 A1 | 12/2020 | Zhang et al. |
| 2020/0396462 A1 | 12/2020 | Zhang et al. |
| 2020/0396465 A1 | 12/2020 | Zhang et al. |
| 2020/0404255 A1 | 12/2020 | Zhang et al. |
| 2020/0413048 A1 | 12/2020 | Zhang et al. |
| 2021/0006780 A1 | 1/2021 | Zhang et al. |
| 2021/0006787 A1 | 1/2021 | Zhang et al. |
| 2021/0029356 A1 | 1/2021 | Zhang et al. |
| 2021/0029362 A1 | 1/2021 | Liu et al. |
| 2021/0029368 A1 | 1/2021 | Zhang et al. |
| 2021/0037240 A1 | 2/2021 | Zhang et al. |
| 2021/0037256 A1 | 2/2021 | Zhang et al. |
| 2021/0051339 A1 | 2/2021 | Liu et al. |
| 2021/0067783 A1 | 3/2021 | Liu et al. |
| 2021/0076050 A1 | 3/2021 | Zhang et al. |
| 2021/0076063 A1 | 3/2021 | Liu et al. |
| 2021/0092379 A1 | 3/2021 | Zhang et al. |
| 2021/0092435 A1 | 3/2021 | Liu et al. |
| 2021/0105482 A1 | 4/2021 | Zhang et al. |
| 2021/0152846 A1 | 5/2021 | Zhang et al. |
| 2021/0203958 A1 | 7/2021 | Zhang et al. |
| 2021/0218980 A1 | 7/2021 | Zhang et al. |
| 2021/0227234 A1 | 7/2021 | Zhang et al. |

FOREIGN PATENT DOCUMENTS

| | | |
|---|---|---|
| CN | 1672174 A | 9/2005 |
| CN | 1777283 A | 5/2006 |
| CN | 102577388 A | 7/2012 |
| CN | 104053005 A | 9/2014 |
| CN | 104221376 A | 12/2014 |
| CN | 107979756 A | 5/2015 |
| CN | 104904207 A | 9/2015 |
| CN | 105306944 A | 2/2016 |
| CN | 105532000 A | 4/2016 |
| CN | 105723713 A | 6/2016 |
| CN | 105917650 A | 8/2016 |
| CN | 106416245 A | 2/2017 |
| CN | 106537915 A | 3/2017 |
| CN | 106559669 A | 4/2017 |
| CN | 106688232 A | 5/2017 |
| CN | 107113442 A | 8/2017 |
| CN | 107211156 A | 9/2017 |
| CN | 107426568 A | 12/2017 |
| CN | 107534778 A | 1/2018 |
| CN | 107852490 A | 3/2018 |
| CN | 107925775 A | 4/2018 |
| CN | 108012153 A | 5/2018 |
| CN | 108432250 A | 8/2018 |
| CN | 108632629 A | 10/2018 |
| GB | 2539213 A | 12/2016 |
| TW | 201540047 A | 10/2015 |
| TW | 201709738 A | 3/2017 |
| TW | 201832557 A | 9/2018 |
| WO | 2000065829 A | 11/2000 |
| WO | 2016048834 A1 | 3/2016 |
| WO | 2016091161 A1 | 6/2016 |
| WO | 2016138513 A1 | 9/2016 |
| WO | 2016183224 A1 | 11/2016 |
| WO | 2017118411 A1 | 7/2017 |
| WO | 2017133661 A1 | 8/2017 |
| WO | 2017157264 A1 | 9/2017 |
| WO | 2017157281 A1 | 9/2017 |
| WO | 2017197126 A1 | 11/2017 |
| WO | 2017206803 A1 | 12/2017 |
| WO | 2018047668 A1 | 3/2018 |
| WO | 2018097692 A2 | 5/2018 |
| WO | 2018097693 A1 | 7/2018 |
| WO | 2018184589 A1 | 10/2018 |

OTHER PUBLICATIONS

Chen et al. "Description of SDR, HDR and 360 degree Video Coding Technology Proposal by Qualcomm and Technicolor—low and high complexity versions," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0021, 2018.

Chen et al. "DMVR Extension baed on Template Matching," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0057, 2018.

Chien et al. "Modification of Merge Candidate Derivation," Joint Video Exploration Team (JVET) of ITU-T SG 16 WP 3 and ISO/IEC JTC 1/SC 29/WG 11, 2nd Meeting, San Diego, USA, Feb. 20-26, 2016, document JVET-B0058, 2016.

He et al. "Non-SCCE1: Improved Intra Block Copy Coding with Block Vector Derivation," Joint Collaborative Team on Video Coding (JCT-VC) of ITU-T SG 16 WP 3 and ISO/IEC JTC 1/SC 29/WG 11, 18th Meeting, Sapporo, JP, Jun. 30-Jul. 9, 2017, document JCTVC-R0165, 2014.

Hsu et al. "Description of SDR Video Coding Technology Proposal by Mediatek," Joint Video Experts Team (JVET) of ITU-T SG 16 WP 3 and ISO/IEC JTC 1/SC 29/WG 11, 10th Meeting, San Diego, US, Apr. 10-20, 2018, document JVET-J0018, 2018.

Li et al. "Adaptive Motion Vector Resolution for Screen Content," Joint Collaborative Team on Video Coding (JCT-VC) of ITU-T SG 16 WP 3 and ISO/IEC JTC 1/SC 29/WG 11, 19th Meeting, Strasbourg, FR, Oct. 17-24, 2014, document JCTVC-S0085, 2014.

Toma et al. "Description of SDR Video Coding Technology Proposal by Panasonic," Joint Video Experts Team (JVET) of ITU-T SG 16 WP 3 and ISO/IEC JTC 1/SC 29/WG 11, 10th Meetingmm San Diego, US, Apr. 10-20, 2018, document JVET-J0020, 2018.

Xu et al., "Intra Block Copy in HEVC Screen Content Coding Extensions," IEEE Journal on Emerging and Selected Topics in Circuits and Systems, Dec. 2016, 6(4):409-419.

Zhang et al. "Rotate Intra Block Copy for Still Image Coding," 2015 IEEE International Conference on Image Processing (ICIP), IEEE, Sep. 27, 2015, pp. 4102-4106.

Zhang et al. "On Adaptive Motion Vector Resolution," Joint Collaborative Team on Video Coding (JCT-VC) of ITU-T SG 16 WP 3 and ISO/IEC JTC 1/SC 29/WG 11, 20th Meeting, Geneva, CH, Feb. 10-18, 2015, document JCTVC-T0059, 2015.

Zou et al. "Improved Affine Motion Prediction," Joint Video Exploration Team (JVET) of ITU-T SG 16 WP3 and ISO/IEC JTC 1/SC 29/WG 11, 3rd Meeting, Geneva, CH, May 26-Jun. 1, 2016, document JVET-00062, 2016.

International Search Report and Written Opinion from PCT/IB2019/054602 dated Aug. 21, 2019 (17 pages).

International Search Report and Written Opinion from PCT/IB2019/054604 dated Sep. 26, 2019 (17 pages).

International Search Report and Written Opinion from PCT/IB2019/054611 dated Aug. 29, 2019 (88 pages).

International Search Report and Written Opinion from PCT/IB2019/054612 dated Sep. 26, 2019 (17 pages).

International Search Report and Written Opinion from PCT/IB2019/054614 dated Aug. 27, 2019 (14 pages).

International Search Report and Written Opinion from PCT/IB2019/054650 dated Oct. 28, 2019 (20 pages).

International Search Report and Written Opinion from PCT/IB2019/054652 dated Sep. 27, 2019 (18 pages).

International Search Report and Written Opinion from PCT/IB2019/054654 dated Aug. 27, 2019 (85 pages).

Sullivan et al. "Meeting Report of the 18th Meeting of the Joint Collaborative Team on Video Coding (JCT-VC), Sapporo, JP, Jun. 30-Jul. 9, 2014", Joint Collaborative Team on Video Coding (JCT-

(56) References Cited

OTHER PUBLICATIONS

VC) of ITU-T SG16 WP3 and ISO/IEC JTC1/SC29/WG11, 18th Meeting: Sapporo, JP, Jun. 30-Jul. 9, 2014, JCTVC-R_Notes_d, 2014.
Non-Final Office Action from U.S. Appl. No. 17/019,629 dated Nov. 13, 2020.
Non-Final Office Action from U.S. Appl. No. 17/011,157 dated Nov. 17, 2020.
Non-Final Office Action from U.S. Appl. No. 17/031,451 dated Dec. 4, 2020.
Non-Final Office Action from U.S. Appl. No. 17/005,521 dated Jan. 7, 2021.
Li et al. "Combining Directional Intra Prediction and Intra Block Copy with Block Partitioning for HEVC,"2016 IEEE International Conference on Image Processing (ICIP), Phoenix, AZ, USA, 2016, pp. 524-528.
Final Office Action from U.S. Appl. No. 17/019,629 dated Feb. 26, 2021.
Alshin et al. "Bi-Directional Optical Flow for Improving Motion Compensation," 28th Picture Coding Symposium PCS2010, Dec. 8, 2010, Nagoya, Japan, pp. 422-425. (cited in CN 201910487926.0 OA dated Apr. 6, 2021).
Chen et al. "Description of SDR, HDR and 360 degree Video Coding Technology Proposal by Huawei, GoPro, HiSilicon, and Samsung," Joint Video Exploration Team (JVET) of ITU-T SG 16 WP 3 and ISO/IEC JTC 1/SC 29/WG 11, 10th Meeting, San Diego, US, 10-20, Apr. 2018, document JVET-J0025, 2018. (cited in TW 108119583 OA dated Apr. 23, 2021).
Final Office Action from U.S. Appl. No. 17/005,521 dated Apr. 26, 2021.
Chen et al. "Description of SDR, HDR and 360 degree Video Coding Technology Propsal by Qualcomm and Tehnicolor—low and high complexity versions," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0021_v5, 2018.
Final Office Action from U.S. Appl. No, 17/161,391 dated Jul. 14, 2021.
Advisory Action from U.S. Appl. No. 17/074,892 dated Aug. 4, 2021.
"High Efficiency Video Coding" Series H: Audiovisual and Multimedia Systems: Infrastructure of Audiovisual Services—Coding of Moving Video, ITU-T, H.265, 2018.
Non-Final Office Action from U.S. Appl. No. 17/071,357 dated Sep. 21, 2021.
Bross et al. "Versatlie Video Coding (Draft 2), " Joint Video Experts Team (JVET) of ITU-T SG 16 WP 3 and ISO/IEC JTC 1/SC 29/WG 11, 11th Meeting, Ljubjana, SI, Jul. 10-18, 2018, document JVET-K1001, 2018.
Bross et al. "Versatile Video Coding (Draft 4)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M1001, 2019.
Bross et al. "Versatile Video Coding (Draft 5)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N1001, 2019.
Chen et al. "EE3: Generalized Bi-Prediction," Joint Video Exploration Team (JVET) of ITU-T SG 16 WP 3 and ISO/IEC JTC 1/SC 29/WG 11, 4th Meeting, Chengdu, CN, Oct. 15-21, 2016, document JVET-D0102, 2016.
JEM-7.0: https://jvet.hhi.fraunhofer.de/svn/svn_HMJEMSoftware/tags/ HM-16.6-JEM-7.0. (Only website).
Han et al. "CE4-Related: Modification on Merge List," Joint Video Exploration Team (JVET) of ITU-T SG 16 WP 3 and ISO/IEC JTC 1/SC 29/WG 11, 13th Meeting, Marrakech, MA, Jan. 9-18, 2019, document JVET-M0127, 2019.
Hsiao et al. "CE4.2.8: Merge Mode Enhancement," Joint Video Experts Team (JVET of ITU-T SG 16 WP 3 and ISO/IEC JTC 1/SC 29/WG 11, 11th Meeting: Ljubljana, SI, Jul. 10-18, 2018, document JVET-K0245, 2018.
Hsiao et al. "CE4.4.12: Pairwise Average Candidates," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0090, 2019.
H.265/HEVC, https://www.itu.int/rec/T-REC-H.265.
Lee et al. "Unified Condition for Affine Merge and Affine Inter Mode," Joint Video Exploration Team (JVET) of ITU-T SG 16 WP 3 and ISO/IEC JTC 1/SC 29/WG 11, 5th Meeting, Geneva, CH, Jan. 12-20, 2017, JVET-E0039, 2017.
Liao et al. "CE10.1.b: Triangular Prediction Unit Mode," Joint Video Exploration Team (JVET) of ITU-T SG 16 WP 3 and ISO/IEC JTC 1/SC 29/WG 11, 12th Meeting, Macao, CN, Oct. 3-12, 2018, document JVET-L0124. 2018.
Li et al. "Multi-Type-Tree." Joint Video Exploration Team (JVET), of ITU-T SG 16 WP 3 aand ISO/IEC JTC 1/SC 29/WG 11, 4th Meeting: Chengdu, CN, Oct. 15-21, 2016, document JVET-D0117rl, 2016.
Li et al. "Non-CE4: Harmonization between HMVP and Gbi," Joint Video Experts Team (JVET) of ITU-T SG 16 WP 3 and ISO/IEC JTC 1/SC 29/WG 11, 13th Meeting: Marrakech, MA, Jan. 9-18, 2019, document JVET-M0264, 2019.
Luthra et al. Overview of the H.264/AVC Video Coding Standard, Proc. SPIE, 5203, Applications of Digital Image Processing, Nov. 19, 2003, Optical Science and Technology, SPIE 48th Annutal Meeting, San Diego, CA, US, 2003.
Su et al. "CE4.4.1: Generalized Bi-Prediction for Intercoding," Joint Video Exploration Team of ISO/IEC JTC 1/SC 29/WG 11 and ITU-T SG 16, Ljubljana, Jul. 11-18, 2018, document No. JVET-K0248, 2018.
Sullivan et al. "Overview of the High Effciency Video Coding (HEVC) Standard," IEEE Transactions on Circuits and Systems for Video Technology, Dec. 2012, 22(12):1649-1668.
Van Der Auwera et al. "Description of Core Experiment 3: Intra Prediction and Mode Coding," Joint Video Experts Team (JVET) of ITU-T SG 16 WP 3 and ISO/IEC JTC 1/SC 29/WG 11, 10th meeting, San Diego, USA, Apr. 10-20, 2018. document JVET-J1023, 2018.
Xu et al. "CE8-Related Combination Test of JVET-N0176/JVET-N0317/JVET-N0382 on Simplification of IBC Vector Prediction," Joint Video Experts Team (JVET) of ITU-T SG 16 WP 3 aand ISO/IEC JTC 1/SC 29/WG 11, 14th Meeting, Geneva, CH, Mar. 19-27, 2019, document JVET-N0843, 2019.
Yang et al. "Description of Core Experiment 4 (CE4): Inter Prediction and Motion Vector Coding," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1024, 2018.
Zhang et al. "CE4-Related: Simplified Affline Prediction," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0103. 2018.
Zhang et al. "CE4-related: History-based Motion Vector Prediction", Joint Video Experts Team (JVET) of ITU-T SG 16 WP 3 and ISO/IEC JTC 1/SC 29/WG 11, 11th Meeting, Ljubljana, SI, Jul. 10-18 (Jul. 2018), document JVET-K0104, 2018.
Zhang et all. "CE4.2.14: Planar Motion Vector Prediction," Joint Video Experts Team (JVET) of ITU-T SG 16 and WP 3 and ISO/IEC JTC 1/SC 29/WG 11, 11th Meeting: Ljubljaba, SI, Jul. 10-18, 2018, document JVET-K0135, 2018.
Zhang et al. "CE4: Affine Prediction with 4x4 Sub-blocks for Chroma Components (Test 4.1.16)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0265, 2018.
Zhang et al. "CE3-Related: Modified Chroma Derived Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0272, 2018.

(56) References Cited

OTHER PUBLICATIONS

Zhang et al. "Adaptive Motion Vector Resolution Rounding Align," Joint Video Experts Team (JVET) of ITU-T SG 16 WP 3 and ISO/IEC JTC 1/SC WG 11, 12th Meeting, Macao, CN, Oct. 3-12, 2018, document JVET-L0377, 2018.

Zhang et al. "BoG Report CE4 Related Contributions," Joint Video Expert Team (JVET) of ITU-T SG 16 WP 3 and ISO/IEC JTC 1/SC 29/WG 11, 13th Meeting: Marrakech, MA, Jan. 9-18, 2019, document JVET-M0843, 2019.

Zhou et al. "Spatial-Temporal Merge Mode (Non Subblock STMVP)," Joint Video Exploration Team (JVET) of ITU-T SG 16 WP 3 and ISO/IEC JTC 1/SC 29/WG 11, 11th Meeting: Ljubljana, SI, Jul. 10-18, 2018, document JVET-K0532, and JVET-K0161, 2018.

International Search Report and Written Opinion from PCT/CN2019/117116 dated Jan. 2, 2020 (9 pages).

International Search Report and Written Opinion from PCT/CN2019/117118 dated Feb. 5, 2020 (9 pages).

International Search Report and Written Opinion from PCT/CN2019/117119 dated Jan. 23, 2020 (9 pages).

International Search Report and Written Opinion from PCT/IB2019/055244 dated Nov. 18, 2019 (18 pages).

International Search Report and Written Opinion from PCT/IB2019/055246 dated Nov. 7, 2019 (18 pages).

International Search Report and Written Opinion from PCT/IB2019/055247 dated Nov. 7, 2019 (21 pages).

International Search Report and Written Opinion from PCT/IB2019/058078 dated Mar. 3, 2020(20 pages).

International Search Report and Written Opinion from PCT/IB2019/058079 dated Mar. 3, 2020(26 pages).

International Search Report and Written Opinion from PCT/IB2019/058081 dated Mar. 25, 2020(21 pages).

Non-Final Office Action from U.S. Appl. No. 17/071,357 dated Dec. 8, 2020.

Non-Final Office Action from U.S. Appl. No. 17/074,842 dated Dec. 23, 2020.

Non-Final Office Action from U.S. Appl. No. 17/074,892 dated Dec. 24, 2020.

Non-Final Office Action from U.S. Appl. No. 17/099,042 dated Dec. 31, 2020.

Notice of Allowance from U.S. Appl. No. 17/071,412 dated Jan. 7, 2021.

Non-Final Office Action from U.S. Appl. No. 17/161,391 dated Mar. 25, 2021.

Li et al. "Affine Deformation Model Based Intra Block Copy Copy for Intra Frame Coding," 2020, Institute of Information and Communication Engineering, Zhejiang University.

* cited by examiner

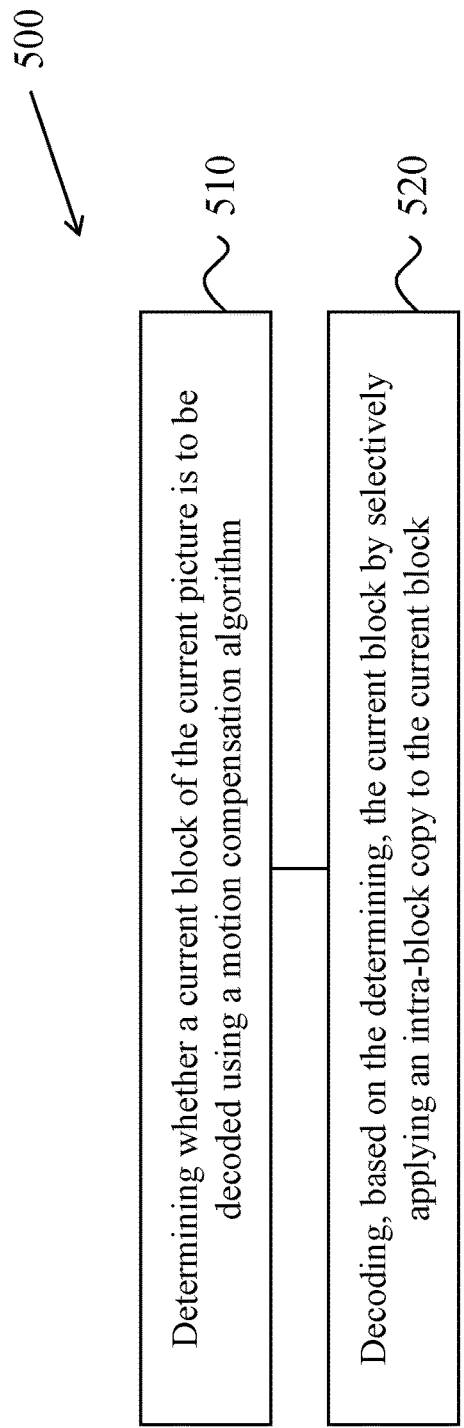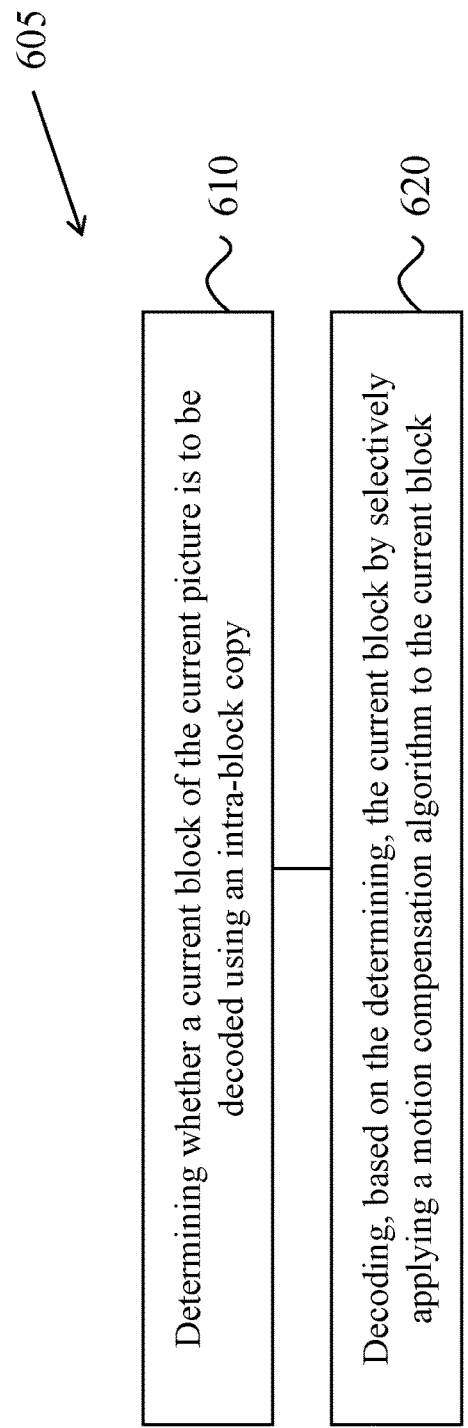
FIG. 5
FIG. 6

INTERACTION BETWEEN IBC AND ATMVP

CROSS REFERENCE TO RELATED APPLICATIONS

This application is a continuation of International Application No. PCT/IB2019/054611, filed on Jun. 4, 2019, which claims the priority to and benefits of International Patent Application No. PCT/CN2018/089920, filed on Jun. 5, 2018. All the aforementioned patent applications are hereby incorporated by reference in their entireties.

TECHNICAL FIELD

This patent document is directed generally to video coding technologies.

BACKGROUND

Motion compensation is a technique in video processing to predict a frame in a video, given the previous and/or future frames by accounting for motion of the camera and/or objects in the video. Motion compensation can be used in the encoding and decoding of video data for video compression.

SUMMARY

Devices, systems and methods related to intra-block copy for motion compensation are described.

In one representative aspect, the disclosed technology may be used to provide a method for video encoding using intra-block copy. This method includes determining whether a current block of the current picture is to be encoded using a motion compensation algorithm, and encoding, based on the determining, the current block by selectively applying an intra-block copy to the current block.

In another representative aspect, the disclosed technology may be used to provide another method for video encoding using intra-block copy. This method includes determining whether a current block of the current picture is to be encoded using an intra-block copy, and encoding, based on the determining, the current block by selectively applying a motion compensation algorithm to the current block.

In yet another representative aspect, the disclosed technology may be used to provide a method for video decoding using intra-block copy. This method includes determining whether a current block of the current picture is to be decoded using a motion compensation algorithm, and decoding, based on the determining, the current block by selectively applying an intra-block copy to the current block.

In yet another representative aspect, the disclosed technology may be used to provide another method for video decoding using intra-block copy. This method includes determining whether a current block of the current picture is to be decoded using an intra-block copy, and decoding, based on the determining, the current block by selectively applying a motion compensation algorithm to the current block.

In yet another representative aspect, a method of decoding visual information is disclosed. The method includes determining, from a coded representation, that a block being decoded representing a portion of the visual information is coded using an alternative temporal motion vector prediction (ATMVP) coding technique; determining that a spatially neighboring block of the block being decoded is coded using an intra-block copy (IBC) coding technique; deciding that the spatially neighboring block cannot provide a motion vector to derive a temporal vector for the block being decoded; and decoding the coded representation by using an ATMVP decoding technique corresponding to the ATMVP coding technique and by excluding use of the spatially neighboring block to provide the motion vector to derive the temporal vector for the block being decoded.

In yet another representative aspect, another method of decoding visual information is disclosed. The method includes determining, from a coded representation, that a block being decoded representing a portion of the visual information is coded using an alternative temporal motion vector prediction (ATMVP) coding technique; determining that a collocated block in a reference picture is coded using an intra-block copy (IBC) coding technique; deciding that the collocated block in the reference picture cannot be used to derive a motion vector for a sub-block of the block being decoded; and decoding the coded representation by using an ATMVP decoding technique corresponding to the ATMVP coding technique and by excluding use of the collocated block in the reference picture to provide a temporal motion vector candidate for the sub-block of the block being decoded.

In yet another representative aspect, another method of visual information processing is disclosed. The method includes encoding the visual information into a plurality of encoded pictures and a plurality of indicators signaling one or more encoding techniques applied, the plurality of indicators comprising an intra-block copy (IBC) technique indicator and an ATMVP technique indicator, wherein a first block of a first picture associated with the visual information is encoded using the IBC technique and a second block of a second picture associated with the visual information is encoded using the ATMVP technique, wherein the IBC technique uses a different block of the first picture to encode the first block of the first picture and the ATMVP technique uses a third picture associated with the visual information to encode the second picture.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 5 shows a flowchart of an example method for video decoding using intra-block copy in accordance with the disclosed technology.

FIG. 6 shows a flowchart of another example method for video decoding using intra-block copy in accordance with the disclosed technology.

DETAILED DESCRIPTION

Figure 1:
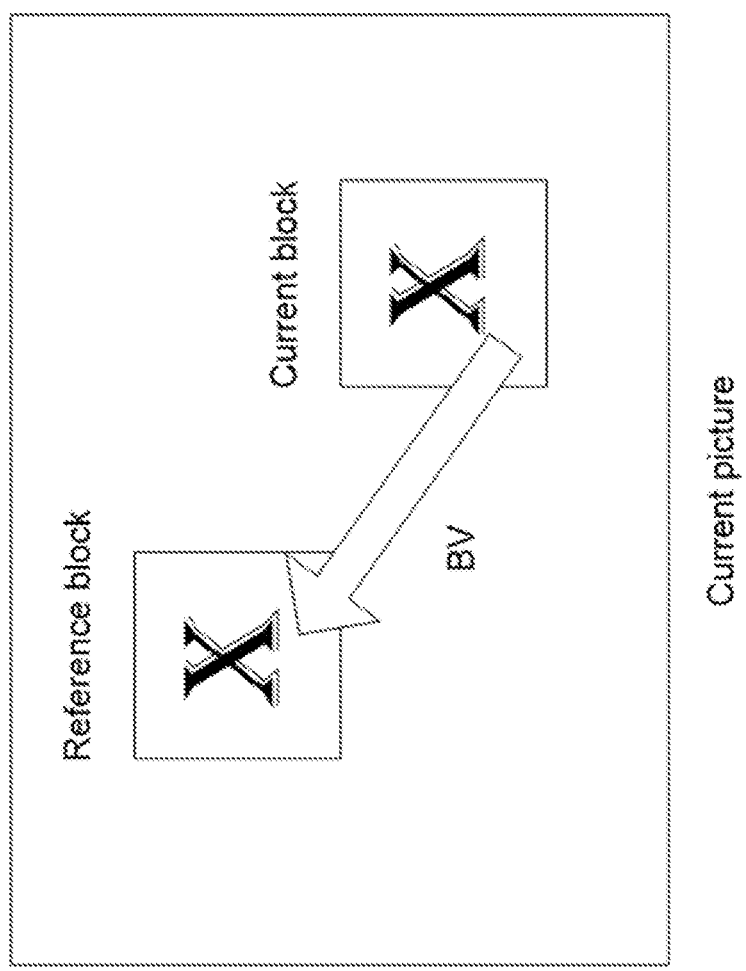
FIG. 1 shows an example of an intra-block copy technique.

Section headings are used in the present document for the ease of understanding and do not limit scope of the technologies and embodiments discussed in each section to just that section.

Due to the increasing demand of higher resolution visual information, such as video, images, three-dimensional scenes, etc., video coding methods and techniques are ubiquitous in modern technology. The techniques described in this application can apply to various visual information including video, images, three-dimensional scenes, etc. A picture of the visual information can be a frame in a video, a portion of an image, an object in a three-dimensional scene, a portion of the three-dimensional scene, etc. A block can be portion of the picture of the visual information such as a coding unit (CU), a largest coding unit (LCU), a sample, a prediction unit (PU) etc. as described in this application. A sub-block of the visual information can be a PU such as a sub-CU, a sample, etc. The PU can be a pixel, a voxel, or a smallest quantum of resolution of the visual information. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Embodiments of the disclosed technology may be applied to existing video coding standards (e.g., HEVC, H.265) and future standards to improve runtime performance. Section headings are used in the present document to improve readability of the description and do not in any way limit the discussion or the embodiments (and/or implementations) to the respective sections only.

1. Examples of Reference Pictures and Reference Picture Lists

In HEVC, there are two types of reference pictures, short-term and long-term. A reference picture may be marked as "unused for reference" when it becomes no longer needed for prediction reference. A completely new approach for reference picture management, referred to as reference picture set (RPS) or buffer description has been introduced by HEVC.

The process of marking pictures as "used for short-term reference", "used for long-term reference", or "unused for reference" is done using the RPS concept. An RPS is a set of picture indicators that is signaled in each slice header and consists of one set of short-term pictures and one set of long-term pictures. After the first slice header of a picture has been decoded, the pictures in the DPB are marked as specified by the RPS. The pictures in the DPB that are indicated in the short-term picture part of the RPS are kept as short-term pictures. The short-term or long-term pictures in the DPB that are indicated in the long-term picture part in the RPS are converted to or kept as long-term pictures. And finally, pictures in the DPB for which there is no indicator in the RPS are marked as unused for reference. Thus, all pictures that have been decoded that may be used as references for prediction of any subsequent pictures in decoding order must be included in the RPS.

An RPS consists of a set of picture order count (POC) values that are used for identifying the pictures in the DPB. Besides signaling POC information, the RPS also signals one flag for each picture. Each flag indicates whether the corresponding picture is available or unavailable for reference for the current picture. Note that even though a reference picture is signaled as unavailable for the current picture, it is still kept in the DPB and may be made available for reference later on and used for decoding future pictures.

From the POC information and the availability flag, five lists of reference pictures as shown in Table 1 can be created. The list RefPicSetStCurrBefore consists of short-term pictures that are available for reference for the current picture and have POC values that are lower than the POC value of the current picture. RefPicSetStCurrAfter consist of available short-term pictures with a POC value that is higher than the POC value of the current picture. RefPicSetStFoll is a list that contains all short-term pictures that are made unavailable for the current picture but may be used as reference pictures for decoding subsequent pictures in decoding order. Finally, the lists RefPicSetLtCurr and RefPicSetLtFoll contain long-term pictures that are available and unavailable for reference for the current picture, respectively.

TABLE 1

List of Reference Picture lists

| List name | Long-term or short-term | Availability flag | POC |
|---|---|---|---|
| RefPicSetStCurrBefore | Short-term | Available | Lower |
| RefPicSetStCurrAfter | Short-term | Available | Higher |
| RefPicSetStFoll | Short-term | Unavailable | — |
| RefPicSetLtCurr | Long-term | Available | — |
| RefPicSetLtFoll | Long-term | Unavailable | — |

1.1 Examples of Short-Term and Long-Term Reference Pictures

The syntax for the general sequence parameter set is shown below:

| | Descriptor |
|---|---|
| seq_parameter_set_rbsp( ) { | |
|   sps_video_parameter_set_id | u(4) |
|   sps_max_sub_layers_minus1 | u(3) |
|   sps_temporal_id_nesting_flag | u(1) |

-continued

|  | Descriptor |
|---|---|
| profile_tier_level( 1, sps_max_sub_layers_minus1 ) | |
| sps_seq_parameter_set_id | ue(v) |
| chroma_format_idc | ue(v) |
| if( chroma_format_idc == 3 ) | |
| ... | |
| } | |
| ... | |
| amp_enabled_flag | u(1) |
| sample_adaptive_offset_enabled_flag | u(1) |
| pcm_enabled_flag | u(1) |
| if( pcm_enabled_flag ) { | |
| ... | |
| } | |
| num_short_term_ref_pic_sets | ue(v) |
| for( i = 0; i < num_short_term_ref_pic_sets; i++ ) | |
|   st_ref_pic_set( i ) | |

-continued

|  | Descriptor |
|---|---|
| long_term_ref_pics_present_flag | u(1) |
| if( long_term_ref_pics_present_flag ) { | |
|   num_long_term_ref_pics_sps | ue(v) |
|   for( i = 0; i < num_long_term_ref_pics_sps; i++ ) { | |
|     lt_ref_pic_poc_lsb_sps[ i ] | u(v) |
|     used_by_curr_pic_lt_sps_flag[ i ] | u(1) |
|   } | |
| } | |
| sps_temporal_mvp_enabled_flag | u(1) |
| ... | |
| } | |

The syntax for the general slice segment header is shown below:

|  | Descriptor |
|---|---|
| slice_segment_header( ) { | |
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   slice_pic_parameter_set_id | ue(v) |
|   if( !first_slice_segment_in_pic_flag ) { | |
|     if( dependent_slice_segments_enabled_flag ) | |
|       dependent_slice_segment_flag | u(1) |
|     slice_segment_address | u(v) |
|   } | |
|   if( !dependent_slice_segment_flag ) { | |
|     for( i = 0; i < num_extra_slice_header_bits; i++ ) | |
|       slice_reserved_flag[ i ] | u(1) |
|     slice_type | ue(v) |
|     if( output_flag_present_flag ) | |
|       pic_output_flag | u(1) |
|     if( separate_colour_plane_flag == 1 ) | |
|       colour_plane_id | u(2) |
|     if( nal_unit_type != IDR_W_RADL && nal_unit_type != IDR_N_LP ) { | |
|       slice_pic_order_cnt_lsb | u(v) |
|       short_term_ref_pic_set_sps_flag | u(1) |
|       if( !short_term_ref_pic_set_sps_flag ) | |
|         st_ref_pic_set( num_short_term_ref_pic_sets ) | |
|       else if( num_short_term_ref_pic_sets > 1 ) | |
|         short_term_ref_pic_set_idx | u(v) |
|       if( long_term_ref_pics_present_flag ) { | |
|         if( num_long_term_ref_pics_sps > 0 ) | |
|           num_long_term_sps | ue(v) |
|         num_long_term_pics | ue(v) |
|         for( i = 0; i < num_long_term_sps + num_long_term_pics; i++ ) { | |
|           if( i < num_long_term_sps ) { | |
|             if( num_long_term_ref_pics_sps > 1 ) | |
|               lt_idx_sps[ i ] | u(v) |
|           } else { | |
|             poc_lsb_lt[ i ] | u(v) |
|             used_by_curr_pic_lt_flag[ i ] | u(1) |
|           } | |
|           delta_poc_msb_present_flag[ i ] | u(1) |
|           if( delta_poc_msb_present_flag[ i ] ) | |
|             delta_poc_msb_cycle_lt[ i ] | ue(v) |
|         } | |
|       } | |
| ... | |

The semantics used in the syntax tables above are defined as:

num_short_term_ref_pic_sets specifies the number of st_ref_pic_set( ) syntax structures included in the SPS. The value of num_short_term_ref_pic_sets shall be in the range of 0 to 64, inclusive.

In some embodiments, a decoder may allocate memory for a total number of num_short_term_ref_pic_sets+1 st_ref_pic_set( ) syntax structures since there may be a st_ref_pic_set( ) syntax structure directly signaled in the slice headers of a current picture. A st_ref_pic_set( ) syntax structure directly signaled in the slice headers of a current picture has an index equal to num_short_term_ref_pic_sets.

long_term_ref_pies_present_flag equal to 0 specifies that no long-term reference picture is used for inter prediction of any coded picture in the CVS. long_term_ref_pics_present_flag equal to 1 specifies that long-term reference pictures may be used for inter prediction of one or more coded pictures in the CVS.

num_long_term_ref_pics_sps specifies the number of candidate long-term reference pictures that are specified in the SPS. The value of num_long_term_ref_pics_sps shall be in the range of 0 to 32, inclusive.

lt_ref_pic_poc_lsb_sps[i] specifies the picture order count modulo MaxPicOrderCntLsb of the i-th candidate long-term reference picture specified in the SPS. The number of bits used to represent lt_ref_pic_poc_lsb_sps[i] is equal to log 2_max_pic_order_cnt_lsb_minus4+4.

used_by_curr_pic_lt_sps_flag[i] equal to 0 specifies that the i-th candidate long-term reference picture specified in the SPS is not used for reference by a picture that includes in its long-term reference picture set (RPS) the i-th candidate long-term reference picture specified in the SPS.

short_term_ref_pic_set_sps_flag equal to 1 specifies that the short-term RPS of the current picture is derived based on one of the st_ref_pic_set( ) syntax structures in the active SPS that is identified by the syntax element short_term_ref_pic_set_idx in the slice header. short_term_ref_pic_set_sps_flag equal to 0 specifies that the short-term RPS of the current picture is derived based on the st_ref_pic_set( ) syntax structure that is directly included in the slice headers of the current picture. When num_short_term_ref_pic_sets is equal to 0, the value of short_term_ref_pic_set_sps_flag shall be equal to 0.

short_term_ref_pic_set_idx specifies the index, into the list of the st_ref_pic_set( ) syntax structures included in the active SPS, of the st_ref_pic_set( ) syntax structure that is used for derivation of the short-term RPS of the current picture. The syntax element short_term_ref_pic_set_idx is represented by Ceil(Log 2(num_short_term_ref_pic_sets)) bits. When not present, the value of short_term_ref_pic_set_idx is inferred to be equal to 0. The value of short_term_ref_pic_set_idx shall be in the range of 0 to num_short_term_ref_pic_sets−1, inclusive.

In some embodiments, the variable CurrRpsIdx is derived as follows:
If short_term_ref_pic_set_sps_flag is equal to 1, CurrRpsIdx is set equal to short_term_ref_pic_set_idx.
Otherwise, CurrRpsIdx is set equal to num_short_term_ref_pic_sets.

num_long_term_sps specifies the number of entries in the long-term RPS of the current picture that are derived based on the candidate long-term reference pictures specified in the active SPS. The value of num_long_term_sps shall be in the range of 0 to num_long_term_ref_pics_sps, inclusive. When not present, the value of num_long_term_sps is inferred to be equal to 0.

num_long_term_pics specifies the number of entries in the long-term RPS of the current picture that are directly signaled in the slice header. When not present, the value of num_long_term_pics is inferred to be equal to 0.

In some embodiments, when nuh_layer_id is equal to 0, the value of num_long_term_pics shall be less than or equal to sps_max_dec_pic_buffering_minus1[TemporalId]−NumNegativePics[CurrRpsIdx]−NumPositivePics[CurrRpsIdx]−num_long_term_sps−TwoVersionsOfCurrDecPicFlag.

lt_idx_sps[i] specifies an index, into the list of candidate long-term reference pictures specified in the active SPS, of the i-th entry in the long-term RPS of the current picture. The number of bits used to represent lt_idx_sps[i] is equal to Ceil(Log 2(num_long_term_ref_pics_sps)). When not present, the value of lt_idx_sps[i] is inferred to be equal to 0. The value of lt_idx_sps[i] shall be in the range of 0 to num_long_term_ref_pics_sps−1, inclusive.

poc_lsb_lt[i] specifies the value of the picture order count modulo MaxPicOrderCntLsb of the i-th entry in the long-term RPS of the current picture. The length of the poc_lsb_lt[i] syntax element is log 2_max_pic_order_cnt_lsb_minus4+4 bits.

used_by_curr_pic_lt_flag[i] equal to 0 specifies that the i-th entry in the long-term RPS of the current picture is not used for reference by the current picture.

In some embodiments, the variables PocLsbLt[i] and UsedByCurrPicLt[i] are derived as follows:
If i is less than num_long_term_sps, PocLsbLt[i] is set equal to lt_ref_pic_poc_lsb_sps[lt_idx_sps[i] ] and UsedByCurrPicLt[i] is set equal to used_by_curr_pic_lt_sps_flag[lt_idx_sps[i] ].
Otherwise, PocLsbLt[i] is set equal to poc_lsb_lt[i] and UsedByCurrPicLt[i] is set equal to used_by_curr_pic_lt_flag[i].

delta_poc_msb_present_flag[i] equal to 1 specifies that delta_poc_msb_cycle_lt[i] is present. delta_poc_msb_present_flag[i] equal to 0 specifies that delta_poc_msb_cycle_lt[i] is not present.

In some embodiments, let prevTid0Pic be the previous picture in decoding order that has TemporalId equal to 0 and is not a RASL, RADL or SLNR picture. Let setOfPrevPocVals be a set consisting of the following:
the PicOrderCntVal of prevTid0Pic,
the PicOrderCntVal of each picture in the RPS of prevTid0Pic,
the PicOrderCntVal of each picture that follows prevTid0Pic in decoding order and precedes the current picture in decoding order.

In some embodiments, when there is more than one value in setOfPrevPocVals for which the value modulo MaxPicOrderCntLsb is equal to PocLsbLt[i], delta_poc_msb_present_flag[i] shall be equal to 1.

delta_poc_msb_cycle_lt[i] is used to determine the value of the most significant bits of the picture order count value of the i-th entry in the long-term RPS of the current picture. When delta_poc_msb_cycle_lt[i] is not present, it is inferred to be equal to 0.

In some embodiments, the variable DeltaPocMsbCycleLt[i] is derived as follows:
if(i==0||i==num_long_term_sps) DeltaPocMsbCycleLt[i]=delta_poc_msb_cycle_lt[i] else DeltaPocMsbCycleLt[i]=delta_poc_msb_cycle_lt[i]+DeltaPocMsbCycleLt[i−1]

1.2 Examples of Motion Vector Prediction (MVP) Between Short-Term and Long-Term Reference Pictures In some embodiments, the motion vector prediction is only allowed if the target reference picture type and the predicted reference picture type is the same. In other words, when the types are different, motion vector prediction is disallowed.

Advanced Motion Vector Prediction (AMVP) is an example of motion vector prediction that includes an existing implementation. The relevant portion of the existing AMVP implementation is detailed below.

The motion vector mvLXA and the availability flag availableFlagLXA are derived in the following ordered steps:

(1) The sample location (xNbA0, yNbA0) is set equal to (xPb−1, yPb+nPbH) and the sample location (xNbA1, yNbA1) is set equal to (xNbA0, yNbA0−1).

(7) When availableFlagLXA is equal to 0, the following applies for (xNbAk, yNbAk) from (xNbA0, yNbA0) to (xNbA1, yNbA1) or until availableFlagLXA is equal to 1:

When availableAk is equal to TRUE and availableFlagLXA is equal to 0, the following applies:

If PredFlagLX[xNbAk][yNbAk] is equal to 1 and LongTermRefPic(currPic, currPb, refIdxLX, RefPicListX) is equal to LongTermRefPic(currPic, currPb, RefIdxLX[xNbAk][yNbAk], RefPicListX), availableFlagLXA is set equal to 1 and the following assignments are made:

mvLXA=MvLX[xNbAk][yNbAk]
refIdxA=RefIdxLX[xNbAk][yNbAk]
refPicListA=RefPicListX

Otherwise, when PredFlagLY[xNbAk][yNbAk] (with Y=!X) is equal to 1 and LongTermRefPic(currPic, currPb, refIdxLX, RefPicListX) is equal to LongTermRefPic(currPic, currPb, RefIdxLY[xNbAk][yNbAk], RefPicListY), availableFlagLXA is set to 1.

The motion vector mvLXB and the availability flag availableFlagLXB are derived in the following ordered steps:

(1) The sample locations (xNbB0, yNbB0), (xNbB1, yNbB1) and (xNbB2, yNbB2) are set equal to (xPb+nPbW, yPb−1), (xPb+nPbW−1, yPb−1) and (xPb−1, yPb−1), respectively.

(5) When isScaledFlagLX is equal to 0, availableFlagLXB is set equal to 0 and the following applies for (xNbBk, yNbBk) from (xNbB0, yNbB0) to (xNbB2, yNbB2) or until availableFlagLXB is equal to 1:

The availability derivation process for a prediction block as specified in clause 6.4.2 is invoked with the luma location (xCb, yCb), the current luma coding block size nCbS, the luma location (xPb, yPb), the luma prediction block width nPbW, the luma prediction block height nPbH, the luma location (xNbY, yNbY) set equal to (xNbBk, yNbBk) and the partition index partIdx as inputs, and the output is assigned to the prediction block availability flag availableBk.

When availableBk is equal to TRUE and availableFlagLXB is equal to 0, the following applies:

If PredFlagLX[xNbBk][yNbBk] is equal to 1 and LongTermRefPic(currPic, currPb, refIdxLX, RefPicListX) is equal to LongTermRefPic(currPic, currPb, RefIdxLX[xNbBk][yNbBk], RefPicListX), availableFlagLXB is set equal to 1 and the following assignments are made:

mvLXB=MvLX[xNbBk][yNbBk]
refIdxB=RefIdxLX[xNbBk][yNbBk]
refPicListB=RefPicListX

Otherwise, when PredFlagLY[xNbBk][yNbBk] (with Y=!X) is equal to 1 and LongTermRefPic(currPic, currPb, refIdxLX, RefPicListX) is equal to LongTermRefPic(currPic, currPb, RefIdxLY[xNbBk][yNbBk], RefPicListY), availableFlagLXB is set equal to 1 and the following assignments are made:

mvLXB=MvLY[xNbBk][yNbBk].

Temporal Motion Vector Prediction (TMVP) is another example of motion vector prediction that includes an existing implementation. The relevant portion of the existing TMVP implementation is detailed below.

The variables mvLXCol and availableFlagLXCol are derived as follows:

If LongTermRefPic(currPic, currPb, refIdxLX, LX) is not equal to LongTermRefPic(ColPic, colPb, refIdxCol, listCol), both components of mvLXCol are set equal to 0 and availableFlagLXCol is set equal to 0.

Otherwise, the variable availableFlagLXCol is set equal to 1, refPicListCol[refIdxCol] is set to be the picture with reference index refIdxCol in the reference picture list listCol of the slice containing prediction block colPb in the collocated picture specified by ColPic.

2. Example Embodiments of Intra-Block Copy (IBC)

Intra-block copy (IBC) has been extends the concept of motion compensation from inter-frame coding to intra-frame coding. As shown in FIG. 1, the current block is predicted by a reference block in the same picture when IBC is applied. The samples in the reference block must have been already reconstructed before the current block is coded or decoded. Although IBC is not so efficient for most camera-captured sequences, it shows significant coding gains for screen content. The reason is that there are lots of reduplicated patterns, such as icons and text characters in a screen content picture. IBC can remove the redundancy between these reduplicated patterns effectively.

In HEVC-SCC, an inter-coded coding unit (CU) can apply IBC if it chooses the current picture as its reference picture. The MV is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/3D video coding standards, the inter-view reference picture is also marked as a "long-term" reference picture.

2.1 Embodiments of Picture Marking when IBC is Enabled

Semantics related to IBC in PPS. pps_curr_pic_ref_enabled_flag equal to 1 specifies that a picture referring to the PPS may be included in a reference picture list of a slice of the picture itself. pps_curr_pic_ref_enabled_flag equal to 0 specifies that a picture referring to the PPS is never included in a reference picture list of a slice of the picture itself. When not present, the value of pps_curr_pic_ref_enabled_flag is inferred to be equal to 0.

It is a requirement of bitstream conformance that when sps_curr_pic_ref_enabled_flag is equal to 0, the value of pps_curr_pic_ref_enabled_flag shall be equal to 0.

The variable TwoVersionsOfCurrDecPicFlag is derived as follows:

TwoVersionsOfCurrDecPicFlag=pps_curr_pic_ref_enabled_flag && (sample_adaptive_offset_enabled_flag||!pps_deblocking_filter_disabled_flag||deblocking_filter_override_enabled_flag)

When sps_max_dec_pic_buffering_minus1[TemporalId] is equal to 0, the value of TwoVersionsOfCurrDecPicFlag shall be equal to 0.

Decoding process. The current decoded picture after the invocation of the in-loop filter process is stored in the DPB in an empty picture storage buffer, the DPB fullness is incremented by one and this picture is marked as "used for short-term reference".

When TwoVersionsOfCurrDecPicFlag is equal to 1, the current decoded picture before the invocation of the in-loop filter process as specified in clause F.8.7 [1] is stored in the DPB in an empty picture storage buffer, the DPB fullness is incremented by one, and this picture is marked as "used for long-term reference".

3. Examples of the Joint Exploration Model (JEM)

In some embodiments, future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

3.1 Examples of Alternative Temporal Motion Vector Prediction (ATMVP)

In the ATMVP method, the temporal motion vector prediction (TMVP) method is modified by fetching multiple sets of motion information (including motion vectors and reference indices) from blocks smaller than the current CU.

Figure 2:
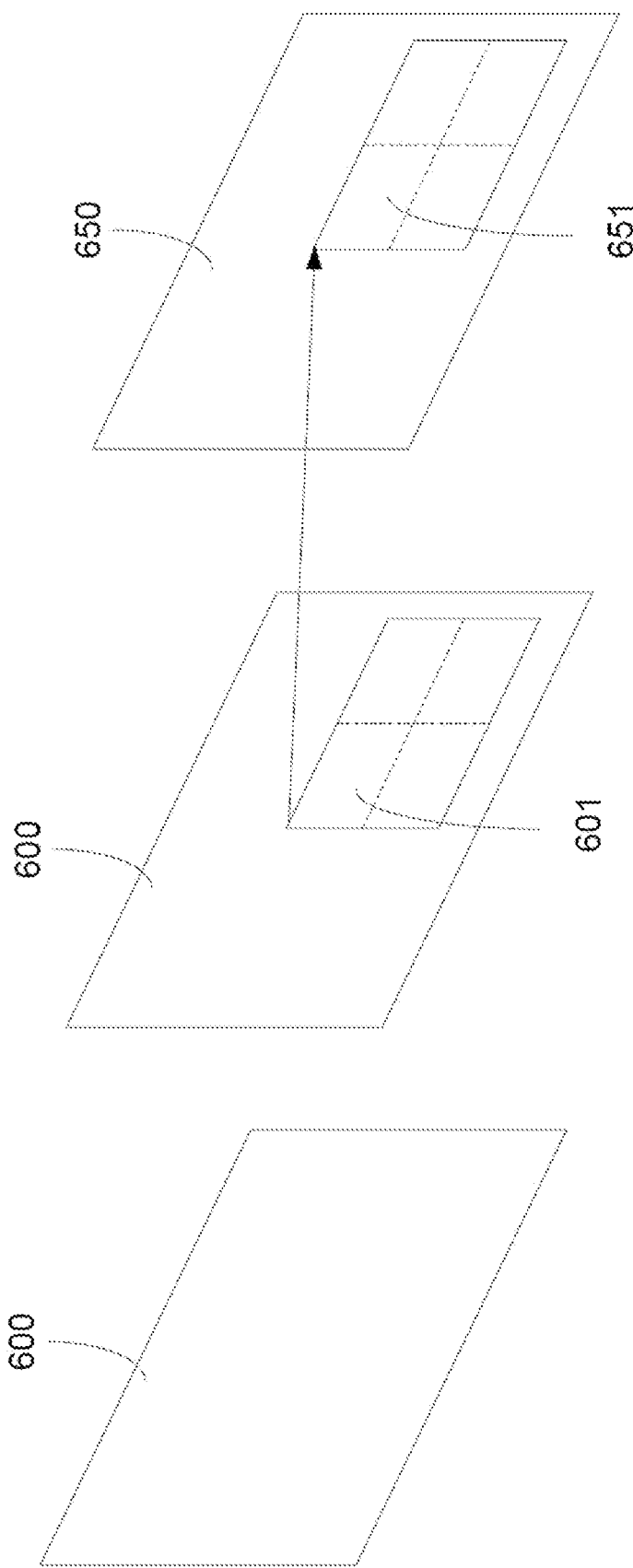
FIG. 2 shows an example of motion prediction using the alternative temporal motion vector prediction (ATMVP) algorithm for a coding unit (CU).

FIG. 2 shows an example of ATMVP motion prediction process for a CU 600. The ATMVP method predicts the motion vectors of the sub-CUs 601 within a CU 600 in two steps. The first step is to identify the corresponding block 651 in a reference picture 650 with a temporal vector. The reference picture 650 is also referred to as the motion source picture. The second step is to split the current CU 600 into sub-CUs 601 and obtain the motion vectors as well as the reference indices of each sub-CU from the block corresponding to each sub-CU.

In the first step, a reference picture 650 and the corresponding block is determined by the motion information of the spatial neighboring blocks of the current CU 600. To avoid the repetitive scanning process of neighboring blocks, the first merge candidate in the merge candidate list of the current CU 600 is used. The first available motion vector as well as its associated reference index are set to be the temporal vector and the index to the motion source picture. This way, the corresponding block may be more accurately identified, compared with TMVP, wherein the corresponding block (sometimes called collocated block) is always in a bottom-right or center position relative to the current CU.

In the second step, a corresponding block of the sub-CU 651 is identified by the temporal vector in the motion source picture 650, by adding to the coordinate of the current CU the temporal vector. For each sub-CU, the motion information of its corresponding block (e.g., the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (e.g. the POCs of all reference pictures of the current picture are smaller than the POC of the current picture) is fulfilled and possibly uses motion vector MVx (e.g., the motion vector corresponding to reference picture list X) to predict motion vector MVy (e.g., with X being equal to 0 or 1 and Y being equal to 1−X) for each sub-CU.

4. Exemplary Methods for IBC in Video Coding

Figure 3:
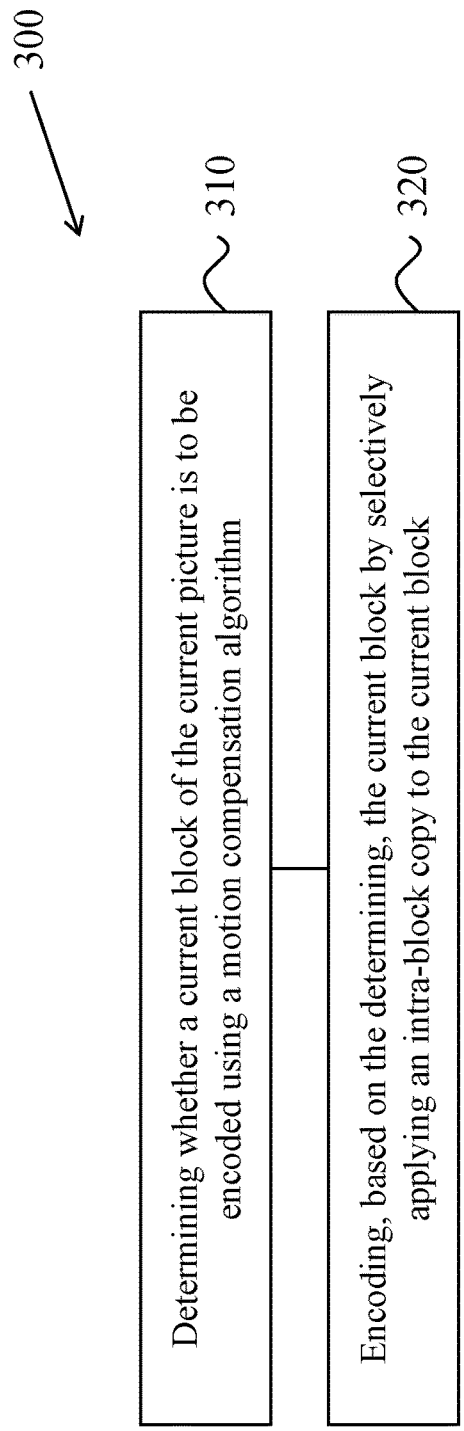
FIG. 3 shows a flowchart of an example method for video encoding using intra-block copy in accordance with the disclosed technology.

FIG. 3 shows a flowchart of an exemplary method for video encoding using intra-block copy. The method 300 includes, at step 310, determining whether a current block of the current picture is to be encoded using a motion compensation algorithm. The method 300 includes, in step 320, encoding, based on the determining, the current block by selectively applying an intra-block copy to the current block. More generally, whether or not to apply the intra-block copy to the current block is based on whether the current block is to be encoded using a specific motion compensation algorithm.

Figure 4:
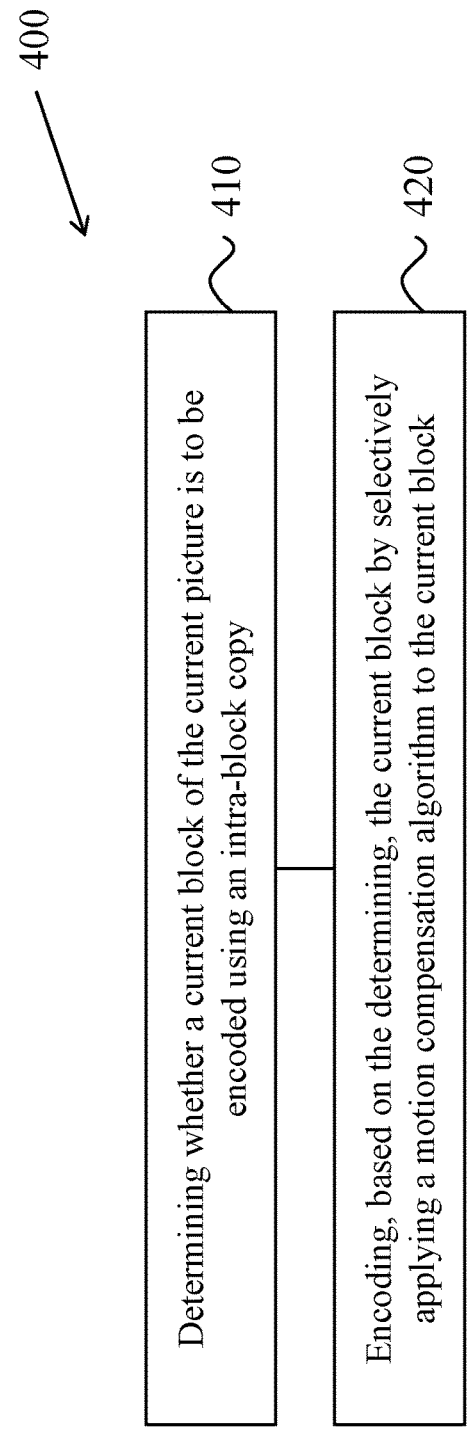
FIG. 4 shows a flowchart of another example method for video encoding using intra-block copy in accordance with the disclosed technology.

FIG. 4 shows a flowchart of another exemplary method video encoding using intra-block copy. The method 400 includes, at step 410, determining whether a current block of the current picture is to be encoded using an intra-block copy. The method 400 includes, in step 420, encoding, based on the determining, the current block by selectively applying a motion compensation algorithm to the current block. More generally, whether or not to encode the current block using the motion compensation algorithm is based on whether the current block is to be encoded using the intra-block copy.

FIG. 5 shows a flowchart of an exemplary method for video decoding using intra-block copy. The method 500 includes, at step 510, determining whether a current block of the current picture is to be decoded using a motion compensation algorithm. The method 500 includes, in step 520, decoding, based on the determining, the current block by selectively applying an intra-block copy to the current block. More generally, whether or not to apply the intra-block copy to the current block is based on whether the current block is to be decoded using a specific motion compensation algorithm.

FIG. 6 shows a flowchart of another exemplary method video decoding using intra-block copy. The method 605 includes, at step 610, determining whether a current block of the current picture is to be decoded using an intra-block copy. The method 605 includes, in step 620, decoding, based on the determining, the current block by selectively applying a motion compensation algorithm to the current block. More generally, whether or not to decode the current block using the motion compensation algorithm is based on whether the current block is to be decoded using the intra-block copy.

The methods 300, 400, 500, 605, 900 and 1000, described in the context of FIGS. 3-6 and 9-10, may further include are further the step of determining whether the motion compensation algorithm is compatible with the intra-block copy. The compatibility of the intra-block copy and the motion compensation algorithms are elucidated in the following examples described for different specific motion compensation algorithms.

Example 1. It is proposed that the temporal vector used in the first step of ATMVP cannot be derived from a neighboring block coded with IBC. In one example, a neighboring block with the current picture as its reference picture is marked as "unavailable" or intra-coded in the first step of ATMVP.

Example 2. It is proposed that a sub-CU's corresponding block is marked as "unavailable" or "intra-coded" if the corresponding block is coded with IBC in the second step of ATMVP.

Example 3. Alternatively, it is proposed that the motion information of a sub-CU's corresponding block is copied to the Sub-CU without any scaling if corresponding block is coded with IBC in the second step of ATMVP. The Sub-CU applies IBC with the same MV as the corresponding block but the reference picture is changed to the current picture.

Example 4. More than one ATMVP candidates may be added wherein one may be derived from temporal neighboring blocks using above methods and the other one is derived from temporal neighboring blocks with at least one sub-CU with different way of deriving sub-CU motion information if the co-located sub-CU is coded with IBC.

Listed below are some examples of the technology described in this application, listed in clause format. A block, as used in this application, can be a contiguous or a noncontiguous collection of pixels, voxels, sub-pixels, and/or sub-voxels. For example, a block can be rectilinear, such as a 4×4 square, 6×4 rectangle, or curvilinear, such as an ellipse.

A portion of the visual information, as used in this application, can be a subset of visual information. A coded representation, as used in this application, can be a bitstream representing the visual information that has been encoded using one of the techniques described in this application. An indicator, as used in this application, can be a flag or a field in the coded representation or can be multiple separate flags or fields.

A decoding technique, as used in this application can be applied by a decoder and can be implemented in hardware or software. The decoding technique can undo in reverse sequence everything a coder does. When an appropriate decoding technique is applied to an encoded representation, a visual information can be obtained as a result. An initial block in the plurality of blocks, as used in this application, is a block occurring before the first block in the coded representation. A collocated reference picture can be a reference picture used in encoding/decoding a block being encoded/decoded.

1. A method of decoding visual information (e.g., method 900 depicted in FIG. 9), comprising: determining (902), from a coded representation, that a block being decoded representing a portion of the visual information is coded using an alternative temporal motion vector prediction (ATMVP) coding technique; determining (904) that a spatially neighboring block of the block being decoded is coded using an intra-block copy (IBC) coding technique; deciding (906) that the spatially neighboring block cannot provide a motion vector to derive a temporal vector for the block being decoded; and decoding (908) the coded representation by using an ATMVP decoding technique corresponding to the ATMVP coding technique and by excluding use of the spatially neighboring block to provide the motion vector to derive the temporal vector for the block being decoded.

2. A method of decoding visual information (e.g., method 1000 depicted in FIG. 10), comprising: determining (1002), from a coded representation, that a block being decoded representing a portion of the visual information is coded using an alternative temporal motion vector prediction (ATMVP) coding technique; determining (1004) that a collocated block in a reference picture is coded using an intra-block copy (IBC) coding technique; deciding (1006) that the collocated block in the reference picture cannot be used to derive a motion vector for a sub-block of the block being decoded; and decoding (1008) the coded representation by using an ATMVP decoding technique corresponding to the ATMVP coding technique and by excluding use of the collocated block in the reference picture to provide a temporal motion vector candidate for the sub-block of the block being decoded.

3. The method of clauses 1-2, comprising: obtaining from the encoded visual information a plurality of blocks representing an encoding of a first picture; decoding an initial block in the plurality of blocks; and upon decoding the initial block, decoding a first block in remaining of the plurality of blocks based on a result of the decoding.

4. The method of clauses 1 to 3, comprising: obtaining from the encoded visual information a plurality of blocks representing an encoding of a second picture; decoding an encoding of the second picture associated with the visual information using the ATMVP decoding technique by performing a two-step process for a block being decoded in the plurality of blocks representing the encoding of the second picture, the two-step process comprising: in a first step of the two-step process obtaining a decoded reference picture of the encoded visual information, a decoded corresponding block in the reference picture corresponding to the block being decoded, and a temporal vector comprising a motion vector of the spatially neighboring block, wherein the spatially neighboring block is a spatial neighbor of the block being decoded; in a second step of the two-step process obtaining a plurality of sub-blocks representing the block being decoded, for each sub-block in the plurality of sub-blocks identifying a corresponding sub-block in the reference picture of the visual information, obtaining a motion vector of the corresponding sub-block, and based on the motion vector the corresponding sub-block deriving the motion of vector for each sub-block in the plurality of sub-blocks; and decoding the plurality of sub-blocks based on the motion vector of the sub-block and a corresponding sub-block in the reference picture of the visual information.

5. The method of clause 4, comprising: assuming that the spatially neighboring block is not encoded using the IBC coding technique.

6. The method of clauses 4-5, comprising: decoding an indicator designating the spatially neighboring block as unavailable or intra-coded for use in the first step of ATMVP decoding technique.

7. The method of clauses 4-6, comprising: decoding an indicator designating the corresponding sub-block as unavailable or intra-coded for use in the second step of ATMVP decoding technique.

8. The method of clauses 4-5, comprising: decoding an indicator designating the spatially neighboring block as using intra coding technique in the first step of ATMVP decoding technique.

9. The method of clauses 4-5, comprising: decoding an indicator designating the corresponding sub-block as using intra coding technique in the second step of ATMVP decoding technique.

10. The method of clauses 1-9, comprising: in a case that the corresponding block of the block being encoded is encoded using the IBC coding technique, copying a motion vector of the corresponding sub-block to a sub-block of the block being encoded without scaling the motion vector of the corresponding sub-block.

11. The method of clause 4, comprising: decoding an indicator associated with the corresponding block indicating that the corresponding block is encoded using the IBC coding technique; and decoding the block being decoded using the second picture as the reference picture.

12. The method of clauses 4-11, comprising: decoding an indicator associated with the corresponding sub-block indicating that the corresponding sub-block is encoded using the IBC coding technique; and decoding the sub-block using the corresponding sub-block encoded using the IBC decoding technique.

13. The method of clause 4, comprising: in a case that the corresponding block of the block being decoded is encoded using the IBC decoding technique, copying a motion vector of the corresponding sub-block to a sub-block of the block being decoded without scaling the motion vector of the corresponding sub-block.

14. The method of clause 13, comprising: changing the reference picture to the second picture including the block being encoded.

15. The method of clause 4, comprising: deriving the motion vector of the sub-block of the block being decoded based on the motion vector of at least one corresponding sub-block encoded using the IBC encoding technique.

Further aspects and variations of the methods described in clauses 1 to 15 are described in the previous section. The decoding methods may be implemented by a video decoder that may include a hardware platform such as described with respect to FIGS. 7 and 8.

16. A method for encoding a visual information, comprising:

encoding the visual information into a plurality of encoded pictures and a plurality of indicators signaling one or more encoding techniques applied, the plurality of indicators comprising an intra-block copy (IBC) technique indicator and an ATMVP technique indicator, wherein a first block of a first picture associated with the visual information is encoded using the IBC technique and a second block of a second picture associated with the visual information is encoded using the ATMVP technique, wherein the IBC technique uses a different block of the first picture to encode the first block of the first picture and the ATMVP technique uses a third picture associated with the visual information to encode the second picture.

17. The method of clause 16, comprising: dividing the first picture into a plurality of blocks; encoding an initial block in the plurality of blocks; and upon encoding the initial block, encoding a first block in the plurality of blocks based on the initial block.

18. The method of clauses 16-17, comprising: encoding the second picture associated with the visual information using the ATMVP technique by dividing the second picture into a plurality of blocks including a block being encoded and performing a two-step process comprising: in a first step of the two-step process identifying a reference picture of the visual information, a corresponding block in the reference picture corresponding to the block being encoded, and a temporal vector comprising a motion vector of a spatially neighboring block, wherein the spatially neighboring block is a spatial neighbor of the block being encoded; in a second step of the two-step process splitting the block being encoded into a plurality of sub-blocks, for each sub-block in the plurality of sub-blocks identifying a corresponding sub-block in the reference picture of the visual information, obtaining a motion vector of the corresponding sub-block, and based on the motion vector the corresponding sub-block deriving a motion of vector for each sub-block in the plurality of sub-blocks; and encoding the sub-block in the plurality of sub-blocks based on the motion vector of the sub-block and the corresponding sub-block in the reference picture of the visual information.

19. The method of clauses 18, comprising: requiring that the spatially neighboring block is not encoded using the IBC technique.

20. The method of clauses 18-19, comprising: in a case that the spatially neighboring block of the block being encoded is encoded using the IBC technique, encoding an indicator designating the spatially neighboring block as unavailable or intra-coded for use in the first step of ATMVP technique.

21. The method of clauses 18-20, comprising: in a case that the reference picture of the visual information is encoded using the IBC technique, encoding an indicator designating the corresponding sub-block as unavailable or intra-coded for use in the second step of ATMVP technique.

22. The method of clauses 18-19, comprising: in a case that the spatially neighboring block of the block being encoded is encoded using the IBC technique, encoding an indicator designating the spatially neighboring block as intra-coded for use in the first step of ATMVP technique.

23. The method of clauses 18-22, comprising: in a case that the reference picture of the visual information is encoded using the IBC technique, encoding an indicator designating the corresponding sub-block as intra-coded for use in the second step of ATMVP technique.

24. The method of clause 18, comprising: in a case that the corresponding block of the block being encoded is encoded using the IBC technique, copying a motion vector of the corresponding sub-block to a sub-block of the block being encoded without scaling the motion vector of the corresponding sub-block.

25. The method of clause 24, comprising: changing the reference picture to the second picture including the block being encoded.

26. The method of clauses 18-25, comprising: deriving the motion vector of the sub-block of the block being encoded based on the motion vector of at least one corresponding sub-block encoded using the IBC technique.

Further aspects and variations of the methods described in clauses 16-26 are described in the previous section. The decoding methods may be implemented by a video decoder that may include a hardware platform such as described with respect to FIGS. 7 and 8.

27. A video processing apparatus comprising a processor configured to implement a method recited in any one or more of clauses 1 to 26.

28. A computer readable medium having processor-executable code stored thereon, the code, upon execution, causing a processor to implement a method recited in any one or more of clauses 1 to 26.

5. Example Implementations of the Disclosed Technology

Figure 7:
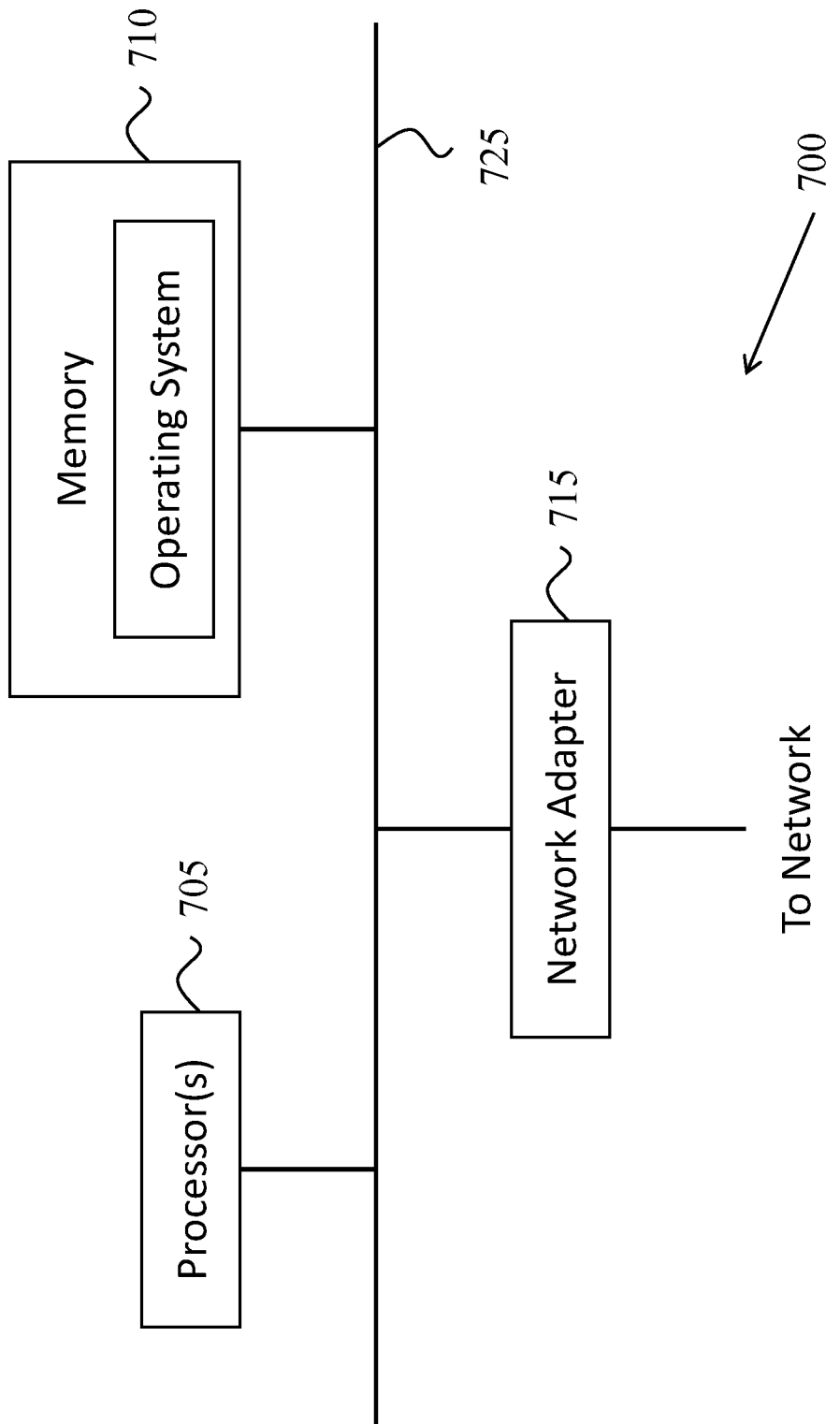
FIG. 7 is a block diagram illustrating an example of the architecture for a computer system or other control device that can be utilized to implement various portions of the presently disclosed technology.

FIG. 7 is a block diagram illustrating an example of the architecture for a computer system or other control device 700 that can be utilized to implement various portions of the presently disclosed technology, including (but not limited to) methods 300, 400, 500 and 605. In FIG. 7, the computer system 700 includes one or more processors 705 and memory 710 connected via an interconnect 725. The interconnect 725 may represent any one or more separate physical buses, point to point connections, or both, connected by appropriate bridges, adapters, or controllers. The interconnect 725, therefore, may include, for example, a system bus, a Peripheral Component Interconnect (PCI) bus, a Hyper- Transport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 705 may include central processing units (CPUs) to control the overall operation of, for example, the host computer. In certain embodiments, the processor(s) 705 accomplish this by executing software or firmware stored in memory 710. The processor(s) 705 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 710 can be or include the main memory of the computer system. The memory 710 represents any suitable form of random access memory (RAM), read-only memory (ROM), flash memory, or the like, or a combination of such devices. In use, the memory 710 may contain, among other things, a set of machine instructions which, when executed by processor 705, causes the processor 705 to perform operations to implement embodiments of the presently disclosed technology.

Also connected to the processor(s) 705 through the interconnect 725 is a (optional) network adapter 715. The network adapter 715 provides the computer system 700 with the ability to communicate with remote devices, such as the storage clients, and/or other storage servers, and may be, for example, an Ethernet adapter or Fiber Channel adapter.

Figure 8:
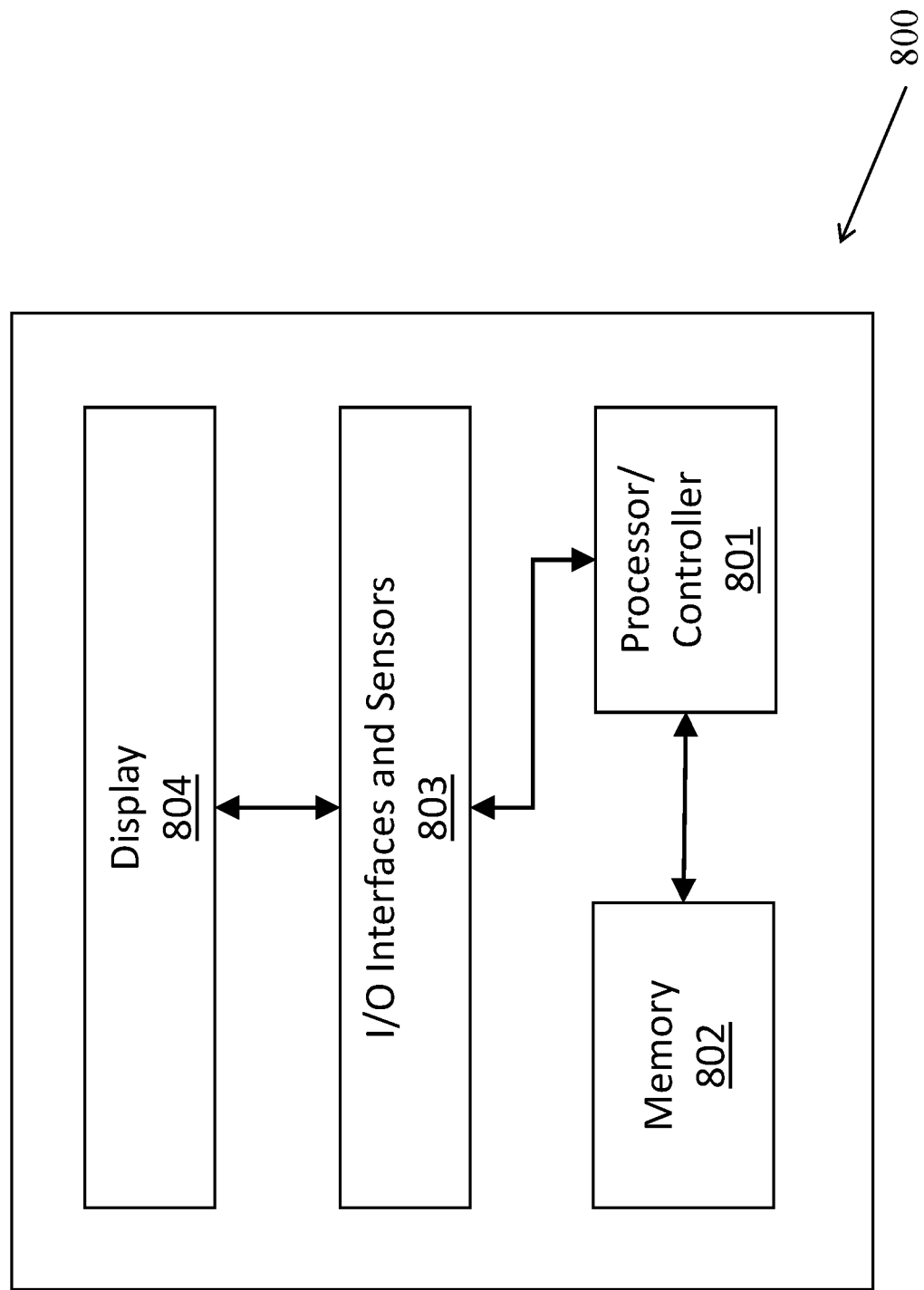
FIG. 8 shows a block diagram of an example embodiment of a mobile device that can be utilized to implement various portions of the presently disclosed technology.
Figure 9:
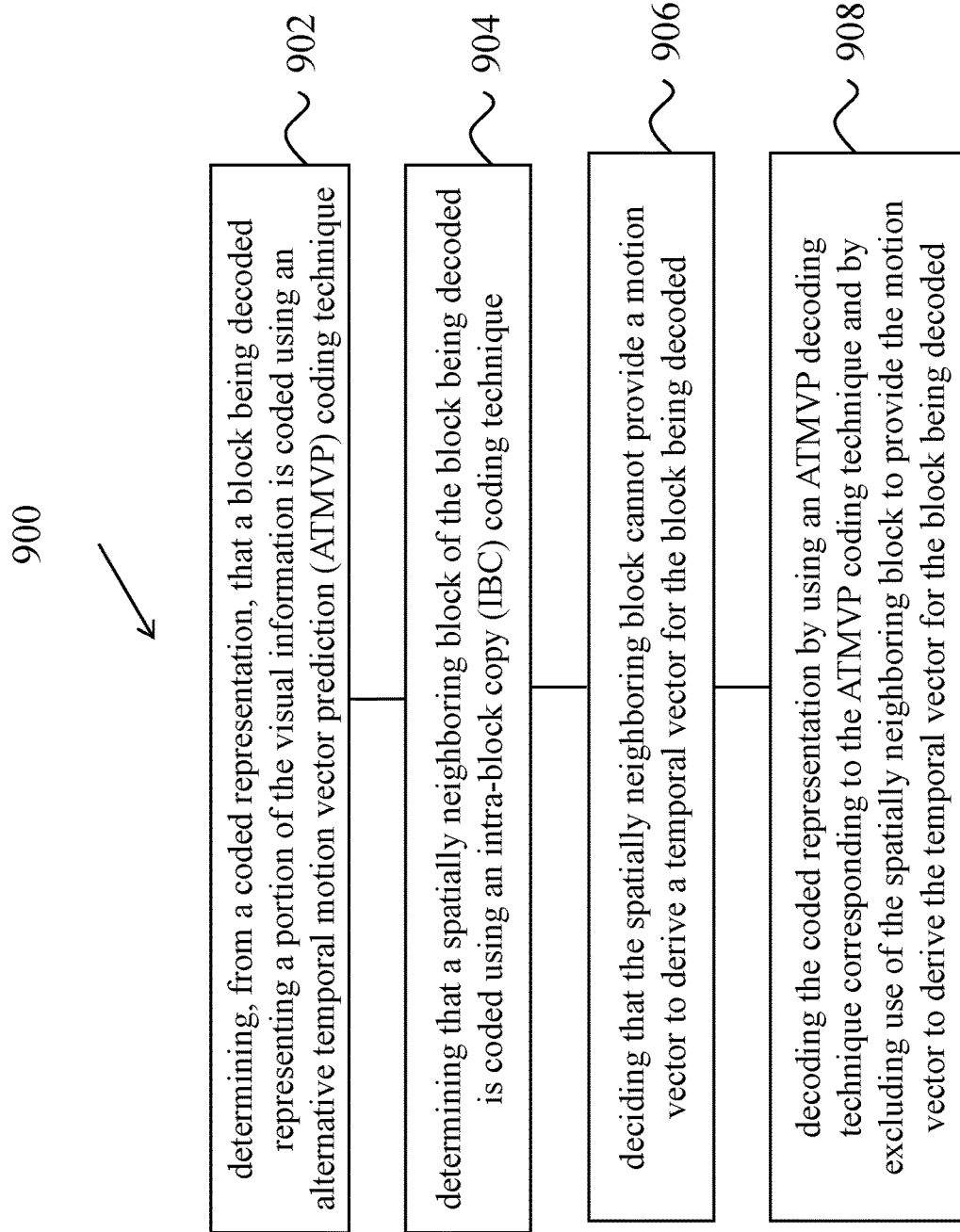
FIG. 9 is a flowchart for an example method of visual information processing.
Figure 10:
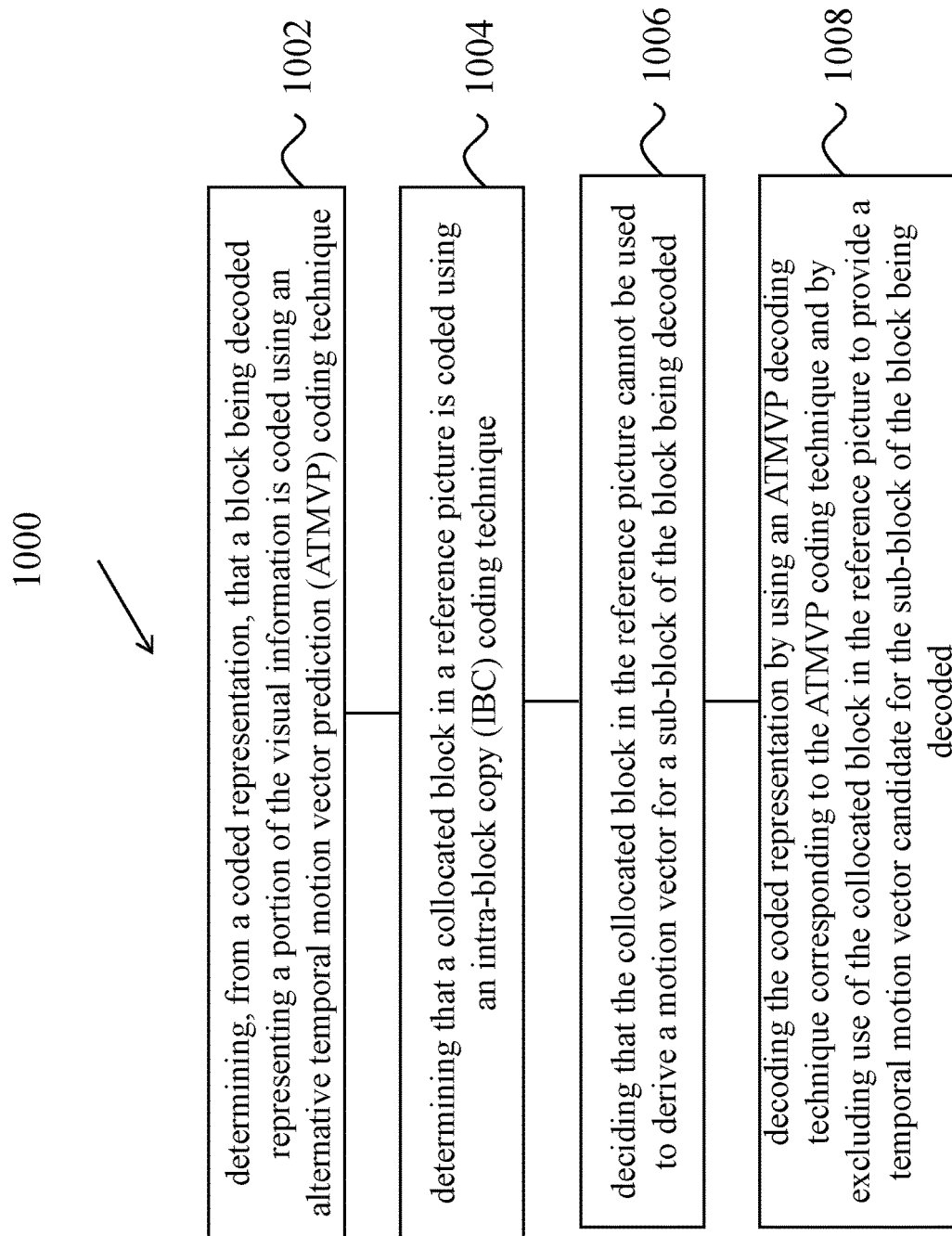
FIG. 10 is a flowchart for an example method of visual information processing.

FIG. 8 shows a block diagram of an example embodiment of a mobile device 800 that can be utilized to implement various portions of the presently disclosed technology, including (but not limited to) methods 300, 400, 500 and 605. The mobile device 800 can be a laptop, a smartphone, a tablet, a camcorder, or other types of devices that are capable of processing videos. The mobile device 800 includes a processor or controller 801 to process data, and memory 802 in communication with the processor 801 to store and/or buffer data. For example, the processor 801 can include a central processing unit (CPU) or a microcontroller unit (MCU). In some implementations, the processor 801 can include a field-programmable gate-array (FPGA). In some implementations, the mobile device 800 includes or is in communication with a graphics processing unit (GPU), video processing unit (VPU) and/or wireless communications unit for various visual and/or communications data processing functions of the smartphone device. For example, the memory 802 can include and store processor-executable code, which when executed by the processor 801, configures the mobile device 800 to perform various operations, e.g., such as receiving information, commands, and/or data, processing information and data, and transmitting or providing processed information/data to another device, such as an actuator or external display.

To support various functions of the mobile device 800, the memory 802 can store information and data, such as instructions, software, values, images, and other data processed or referenced by the processor 801. For example, various types of Random Access Memory (RAM) devices, Read Only Memory (ROM) devices, Flash Memory devices, and other suitable storage media can be used to implement storage functions of the memory 802. In some implementations, the mobile device 800 includes an input/output (I/O) unit 803 to interface the processor 801 and/or memory 802 to other modules, units or devices. For example, the I/O unit 803 can interface the processor 801 and memory 802 with to utilize various types of wireless interfaces compatible with typical data communication standards, e.g., such as between the one or more computers in the cloud and the user device. In some implementations, the mobile device 800 can interface with other devices using a wired connection via the I/O unit 803. The mobile device 800 can also interface with other external interfaces, such as data storage, and/or visual or audio display devices 804, to retrieve and transfer data and information that can be processed by the processor, stored in the memory, or exhibited on an output unit of a display device 804 or an external device. For example, the display device 804 can display a video frame that includes a block (a CU, PU or TU) that applies the intra-block copy based on whether the block is encoded using a motion compensation algorithm, and in accordance with the disclosed technology.

In some embodiments, a video decoder apparatus may implement a method of video decoding in which the intra-block copy as described herein is used for video decoding. The method may be similar to the above-described methods 300, 400, 500 and 605.

In some embodiments, a decoder-side method of video decoding may use the intra-block copy for improving video quality by determining whether a current block of the current picture is to be decoded using a motion compensation algorithm, and decoding, based on the determining, the current block by selectively applying an intra-block copy to the current block.

In other embodiments, a decoder-side method of video decoding may use the intra-block copy for improving video quality by determining whether a current block of the current picture is to be decoded using an intra-block copy, and decoding, based on the determining, the current block by selectively applying a motion compensation algorithm to the current block.

In some embodiments, the video decoding methods may be implemented using a decoding apparatus that is implemented on a hardware platform as described with respect to FIG. 7 and FIG. 8.

Below are improvements measured by incorporating IBC into VTM-1.0, which is a reference software for the video coding standard named Versatile Video Coding (VVC). VTM stands for VVC Test Model.

|  | Over VTM-1.0 | | | | |
| --- | --- | --- | --- | --- | --- |
|  | Y | U | V | EncT | DecT |
| Class A1 | −0.33% | −0.50% | −0.49% | 162% | 100% |
| Class A2 | −0.96% | −1.17% | −0.77% | 159% | 98% |
| Class B | −0.94% | −1.14% | −1.34% | 162% | 102% |
| Class C | −1.03% | −1.58% | −1.92% | 160% | 101% |
| Class E | −1.48% | −1.46% | −1.80% | 160% | 104% |
| Overall | −0.95% | −1.19% | −1.31% | 161% | 101% |
| Class D | −0.57% | −0.73% | −0.91% | 161% | 100% |
| Class F (optional) | −20.25% | −20.15% | −20.93% | 194% | 95% |
| Class SCC 1080p | −52.94% | −53.26% | −53.37% | 217% | 74% |

In the above table, "Y", "U", "V" represent colors in the YUV color encoding system which encodes a color image or video taking human perception into account. The EncT and DecT represent a ratio of the encoding and decoding time using the IBC compared to the encoding and decoding time without the IBC, respectively. Specifically, EncT=TestEncodingTime/anchorEncodingTime DecT=TestEncodingTime/anchorEncodingTime.

The various classes, such as Class A1, Class A2, etc., represent a grouping of standard video sequences used in testing performance of various video coding techniques. The negative percentages under the "Y", "U", "V" columns represent bit-rate savings when IBC is added to VTM-1.0. The percentages under the EncT and DecT columns that are over 100% show how much the encoding/decoding with IBC is slower than encoding/decoding without IBC. For example, a percentage of 150% means that the encoding/decoding with IBC is 50% slower than the encoding/decoding without the IBC. The percentage below 100% shows how much the encoding/decoding with IBC is faster than encoding/decoding without the IBC. Two classes, class F and class SCC, highlighted in green him and in the table above, show that bit-rate savings exceed 3%.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of coding video data, comprising:
   determining, during a conversion between a current video block of a video and a bitstream representation of the video, that the current video block is coded with a subblock-based temporal motion vector prediction (SbTMVP) mode;

determining whether a spatial neighboring block of the current video block is coded with an intra-block copy (IBC) mode;
determining that motion information of the spatial neighboring block is unavailable in response to the spatial neighboring block is coded with the IBC mode; and
identifying at least one corresponding video region in a collocated picture of the current video block without using the motion information of the spatial neighboring block.

2. The method of claim 1, further comprising:
determining whether the corresponding video region is coded with the IBC mode;
determining that motion information of the corresponding video region is unavailable in response to the corresponding video region is coded with the IBC mode; and
performing the conversion between the current video block and the bitstream representation.

3. The method of claim 2, wherein for the IBC mode, a prediction is derived from sample values of a same slice as determined by block vectors.

4. The method of claim 1, further comprising:
determining that an indicator designating the spatial neighboring block as unavailable or intra-coded is presented in the bitstream representation in response to the spatial neighboring block being coded with the IBC mode.

5. The method of claim 1, further comprising:
determining that an indicator designating the corresponding video region as unavailable or intra-coded is presented in the bitstream representation in response to the corresponding video region being coded with the IBC mode.

6. The method of claim 1, further comprising:
decoding an indicator designating the spatial neighboring block as using intra coding technique in the SbTMVP mode.

7. The method of claim 1, further comprising:
decoding an indicator designating the corresponding video region as using intra coding technique in the SbTMVP mode.

8. The method of claim 1, wherein the conversion includes encoding the current video block into the bitstream representation.

9. The method of claim 1, wherein the conversion includes decoding the current video block from the bitstream representation.

10. An apparatus for coding video data comprising a processor and a non-transitory memory with instructions thereon, wherein the instructions upon execution by the processor, cause the processor to:
determining, during a conversion between a current video block of a video and a bitstream representation of the video, that the current video block is coded with a subblock-based temporal motion vector prediction (SbTMVP) mode;
determining whether a spatial neighboring block of the current video block is coded with an intra-block copy (IBC) mode;
determining that motion information of the spatial neighboring block is unavailable in response to the spatial neighboring block is coded with the IBC mode; and
identifying at least one corresponding video region in a collocated picture of the current video block without using the motion information of the spatial neighboring block.

11. The apparatus of claim 10, further comprising:
determining whether the corresponding video region is coded with the IBC mode;
determining that motion information of the corresponding video region is unavailable in response to the corresponding video region is coded with the IBC mode; and
performing the conversion between the current video block and the bitstream representation.

12. The apparatus of claim 11, wherein for the IBC mode, a prediction is derived from sample values of a same slice as determined by block vectors.

13. The apparatus of claim 10, further comprising:
determining that an indicator designating the spatial neighboring block as unavailable or intra-coded is presented in the bitstream representation in response to the spatial neighboring block being coded with the IBC mode.

14. The apparatus of claim 10, further comprising:
determining that an indicator designating the corresponding video region as unavailable or intra-coded is presented in the bitstream representation in response to the corresponding video region being coded with the IBC mode.

15. The apparatus of claim 10, further comprising:
decoding an indicator designating the spatial neighboring block as using intra coding technique in the SbTMVP mode.

16. The apparatus of claim 10, further comprising:
decoding an indicator designating the corresponding video region as using intra coding technique in the SbTMVP mode.

17. The apparatus of claim 10, wherein the conversion includes encoding the current video block into the bitstream representation.

18. The apparatus of claim 10, wherein the conversion includes decoding the current video block from the bitstream representation.

19. A non-transitory computer-readable storage medium storing instructions that cause a processor to:
determining, during a conversion between a current video block of a video and a bitstream representation of the video, that the current video block is coded with a subblock-based temporal motion vector prediction (SbTMVP) mode;
determining whether a spatial neighboring block of the current video block is coded with an intra-block copy (IBC) mode;
determining that motion information of the spatial neighboring block is unavailable in response to the spatial neighboring block is coded with the IBC mode; and
identifying at least one corresponding video region in a collocated picture of the current video block without using the motion information of the spatial neighboring block.

20. A non-transitory computer-readable recording medium storing a bitstream representation which is generated by a method performed by a video processing apparatus, wherein the method comprises:
determining, during a conversion between a current video block of a video and a bitstream representation of the video, that the current video block is coded with a subblock-based temporal motion vector prediction (SbTMVP) mode;
determining whether a spatial neighboring block of the current video block is coded with an intra-block copy (IBC) coding mode;

determining that motion information of the spatial neighboring block is unavailable in response to the spatial neighboring block is coded with the IBC mode; and identifying at least one corresponding video region in a collocated picture of the current video block without using the motion information of the spatial neighboring block;

generating the bitstream representation from the current video block.

* * * * *